US012595356B2

(12) United States Patent
Curtis et al.

(10) Patent No.: US 12,595,356 B2
(45) Date of Patent: Apr. 7, 2026

(54) COMPOSITE PARTICLE AND USE THEREOF IN OPTICAL FILTRATION

(71) Applicant: Coloursmith Labs Inc., Halifax (CA)

(72) Inventors: William Curtis, Halifax (CA);
Morrgan Payne, Halifax (CA);
Raymond Bennett, Halifax (CA);
Gabrielle Tina Masone, Halifax (CA)

(73) Assignee: COLOURSMITH LABS INC., Halifax (CA)

( * ) Notice: Subject to any disclaimer, the term of this patent is extended or adjusted under 35 U.S.C. 154(b) by 502 days.

(21) Appl. No.: 18/265,022

(22) PCT Filed: Dec. 1, 2021

(86) PCT No.: PCT/CA2021/051716
§ 371 (c)(1),
(2) Date: Jun. 2, 2023

(87) PCT Pub. No.: WO2022/115948
PCT Pub. Date: Jun. 9, 2022

(65) Prior Publication Data
US 2024/0026127 A1      Jan. 25, 2024

Related U.S. Application Data

(60) Provisional application No. 63/120,523, filed on Dec. 2, 2020.

(51) Int. Cl.
*C08K 9/10* (2006.01)
*G02B 1/04* (2006.01)

(52) U.S. Cl.
CPC ............... *C08K 9/10* (2013.01); *G02B 1/041* (2013.01)

(58) Field of Classification Search
None
See application file for complete search history.

(56) References Cited

FOREIGN PATENT DOCUMENTS

| | | | |
|---|---|---|---|
| WO | 2918029249 A1 | 2/2018 |
| WO | 2019110264 A1 | 6/2019 |
| WO | 2019168471 A1 | 9/2019 |
| WO | 2020237363 A1 | 12/2020 |

OTHER PUBLICATIONS

A. Ribeiro et al., Poloxamine Micellar Solubilization of Alpha-Tocopheral for Topical Ocular Treatment, Colloids and Surfaces B: Biointerfaces, Issue 103, pp. 550-557, 2013, Spain.

N. Petzetakis et al., Hollow Block Copolymer Nanoparticles Through a Spontaneous One-Step Structural Reorganization. ACS Nano, vol. 7, Issue No. 2, pp. 1120-1128, 2013.

*Primary Examiner* — Jeffrey D Washville
(74) *Attorney, Agent, or Firm* — SMART & BIGGAR LP

(57) ABSTRACT

The present disclosure relates to a composite particle comprising a dye, an amphiphilic block copolymer and a free radical scavenger, and the use thereof in the preparation of ophthalmic lenses and/or thin-film coating such as sol-gel coating on ophthalmic lenses. The present disclosure also relates to methods of optical filtration using the composite particles of the present disclosure.

20 Claims, 19 Drawing Sheets

COMPOSITE PARTICLE AND USE THEREOF IN OPTICAL FILTRATION

CROSS-REFERENCE TO RELATED APPLICATION

The present application is a U.S. national phase entry of PCT/CA2021/051716, filed Dec. 1, 2021, which claims priority to U.S. Provisional Patent Application No. 63/120,523, which was filed Dec. 2, 2020, the contents of which are incorporated herein by reference in their entirety.

FIELD

The present disclosure relates to the field of optical filtration, especially in ophthalmic lenses. The present disclosure further relates to composite particles and their use in ophthalmic lens as optical filters.

BACKGROUND

Ophthalmic lenses are primarily produced by addition of a catalyst to a polymerizable solution followed by exposure to heat. The catalyst used is some form of an organic peroxide which, when exposed to heat, releases free radicals controllably into the monomer solution. The free radicals in turn catalyze the polymerization reaction of the monomer resulting in an ophthalmic lens.

The nature and quantity of the catalyst chosen for the reaction, and the temperature of the polymerization reaction affects the creation of ophthalmic lenses. Depending on the conditions used, the crosslinking of the monomer during the polymerization reaction can be altered. This can in turn, impact the physical and mechanical properties of the ophthalmic lenses.

To create ophthalmic lenses that absorb specific wavelengths of light, a dye or pigment can be added to the lenses. One method to achieve this is to add the dye to the bulk liquid polymerizable solution before the polymerization has occurred. Although this step can be integrated into manufacturing practices, without significantly affecting the physical properties of the lenses themselves, a major hurdle of this process is that catalysts such as organic peroxides are used in the lens fabrication. Organic peroxides are known to degrade dyes even at very low concentrations due to the free radicals formed and the unsaturated nature of dyes. Upon free radical exposure, dyes will lose conjugated double bonds, and thus degrade and change or lose colour, often resulting in a yellowing effect on the lenses.

Yellowing of the lenses is detrimental to the creation of ophthalmic lenses as the desired light filtering is not achieved due to degradation of the dye, and the dyes now filter light at undesired wavelengths. This lens yellowing additionally poses aesthetic concerns, as the wearer of the lenses would have an altered colour perception.

Therefore, there is a need to create ophthalmic lens light filters that absorb specific wavelengths of light and to develop a method of dye incorporation that is compatible with ophthalmic lens manufacture.

Optical filters may also be added to an ophthalmic lens through a thin film coating on the surface of the lens, typically applied using a sol gel process. As the optical filtering dyes are on the surface of the lens, they are prone to photochemical damage from UV and high-energy visible light resulting in a bleaching or "fading" of the colour. Long exposures to sources of bright light, such as the sun, can result in significantly decreased filtering quality of an ophthalmic lens.

Therefore, there is a need to develop a method to incorporate optical filters, or dyes into sol gel coatings on ophthalmic lenses while avoiding photobleaching.

SUMMARY

It has been shown that dyes added to ophthalmic lens monomer can be protected from interacting with the organic peroxide catalyst and the resulting free radicals formed during polymerization.

Without wishing to be bound by theory, nanoparticles with encapsulated dyes can be used to form a barrier to prevent the dye from interacting with the peroxide catalyst while still imparting its light absorbing characteristics. Dye can be concentrated in the core of the particles and be effectively removed from contact from the organic peroxides.

Polymer micelles are nanoparticles comprising an amphiphilic polymer, that self-assemble according to the polarity of their components. A hydrophobic dye may be encapsulated in a normal phase micelle, having a nonpolar interior (core) and polar exterior (shell), whereas a hydrophilic dye may be encapsulated in a reverse phase micelle, having a polar interior (core) and nonpolar exterior (shell). This morphology may be used to solubilize a dye in a medium in which it is not inherently soluble.

Free radical scavengers are molecules that are capable of protecting environments and molecules from damage caused by radicals by sequestering them. Free radical scavengers can react with radicals to form stable molecules and remove the radicals from the environment.

Free radical scavengers can be used to neutralize free radicals from solution and prevent the dye of interest from interacting with the free radicals and degrading. However, free radical scavengers are not selective, and would also neutralize free radicals required for polymerization of the ophthalmic lens monomer.

Free radical scavengers are selected based on their solubility and the encapsulate solubility. A hydrophobic dye can be encapsulated in the core of a nanoparticle along with a free radical scavenger that is also hydrophobic. A hydrophilic dye can be encapsulated along with a free radical scavenger that is also hydrophilic in the core of a nanoparticle.

Nanoparticles with encapsulated dye and encapsulated free radical scavengers can be used to form a barrier to prevent the dye from interacting with organic peroxides, and the free radical scavenger can prevent free radicals from interacting with the dye. In this manner, the dyes will be prevented from degradation and the monomer solution will still be exposed to free radicals for polymerization.

It has been shown herein that encapsulating dye into particles such as core-shell nanoparticles together with a free radical scavenger improves stability of the dye and maintains its optical filter properties compared to free dye, when exposed to catalysts used in ophthalmic lens manufacture. It has been shown that dyes such as Zn (II) TPP, Remazol Brilliant Blue R, and Sudan blue (II) as well as free radical scavengers such as α-tocopherol and ascorbic acid can be incorporated into micelle particles formed by amphiphilic block copolymers, and the resulting particles are stable when contacted with organic peroxide catalyst used in polymerization of allyl monomers used in ophthalmic lens. Further, it has been shown that encapsulating free radical scavengers into a nanoparticle minimizes the impact of free radical scavenger on polymerization of the ophthalmic lens monomers.

Further, it has been shown here that encapsulation of dyes increases resistance to photochemical damage from UV or high-energy visible (HEV) light. The coencapsulation of free-radical scavengers also provides a protection benefit to dyes upon exposure to such light sources.

Without wishing to be bound by theory, encapsulation of a dye in a composite particle can decrease total exposure of the dye to sources of light, due to decreased surface area compared to a homogenously dissolved free dye. Nanoparticle comprising polymers are also known to naturally absorb UV light, contributing to a protective effect. Without wishing to be bound by theory, photodegradation of dyes is related to a series of chemical reactions including photo-induced oxidation of the dyes. The process can involve electron transfer from the valence band (HOMO) to the conduction band (LUMO) upon illumination with an appropriate wavelength of light. The resulting excitons react with oxygen or water to produce superoxide anions and hydroxide radicals. These species have the high oxidising power to degrade numerous molecules including industrial dyes. Intrinsic reactive oxygen species (ROS) namely hydroxyl radical ($\bullet$OH), hydrogen peroxide ($H_2O_2$), superoxide anion radical ($\bullet O^{2-}$) and singlet oxygen ($^1O_2$), have been identified as the reactive oxygen species responsible for dye degradation.

It can be appreciated that many derivatives of a dye can exist. Modifications to existing dyes to change physical and chemical properties are possible. Therefore, dyes expressed in this application are exemplary embodiments of the invention and are not an exhaustive list of possible dyes to encapsulate.

Encapsulation of a dye in a composite nanoparticle using amphiphilic copolymers depends upon the hydrophilicity of the dye particle and the matrix in which the nanoparticle will be suspended. In a hydrophobic medium, a hydrophilic dye can be encapsulated in a composite nanoparticle to impart solubility. Likewise, in a hydrophilic medium, a hydrophobic dye can be encapsulated in a composite nanoparticle to impart solubility.

It has also been shown that dyes can be encapsulated with photo-stabilizing agents, such as free radical scavengers including α-tocopherol. Photo-stabilizing agents such as free radical scavengers can neutralize reactive oxygen radical species and achieve antioxidative effects.

By encapsulating both materials, the photostabilizing agent is at an increased local concentration to the dye, efficiently increasing the resistance of the optical filtering dyes to photochemical damage. Encapsulation of both optical filtering dyes and photostabilizing agents allows for an optical filtering additive with exceptional resistance to photochemical damage. It has been shown that the composite particle of the present disclosure can be included in a composition useful in coating of ophthalmic lens. For instance, the composite particle of the present disclosure can be incorporated into a thin-film coating applied on an ophthalmic lens. The thin-film coating can be a sol-gel coating.

Accordingly, in one aspect, the present disclosure includes a composite particle comprising a dye having an absorbance in the range of from the ultraviolet (UV) region to the infrared (IR) region of the electromagnetic spectrum;

a free radical scavenger; and an amphiphilic block copolymer encapsulating the dye and the free radical scavenger.

In another aspect, the present disclosure includes an ophthalmic lens monomer solution composition comprising a composite particle as defined herein;

a polymerizable monomer; and a catalyst suitable for initiating polymerization of the polymerizable monomer.

In another aspect, the present disclosure includes a method of preparing an ophthalmic lens monomer composition solution comprising providing a composite particle as defined herein; and mixing the composite particle with a polymerizable monomer, a catalyst suitable for initiating polymerization of the polymerizable monomer.

In another aspect, the present application includes an ophthalmic lens comprising a composite particle of the present disclosure.

In another aspect, the present application includes a method of preparing an ophthalmic lens comprising preparing an ophthalmic lens monomer solution of the present disclosure; and polymerizing the ophthalmic lens monomer solution.

In another aspect, the present disclosure includes a method of optical filtration in an ophthalmic lens comprising selectively blocking light radiation using one or more composite particles of the present disclosure.

In another aspect, the present disclosure includes the use of one or more composite particles of the present disclosure for selectively blocking light radiation in an ophthalmic lens.

In another aspect, the present disclosure includes the use of one or more composite particles of the present disclosure in the preparation of an ophthalmic lens monomer solution.

In another aspect, the present disclosure includes the use of one or more composite particles of the present disclosure in the preparation of an ophthalmic lens.

In another aspect, the present disclosure includes a kit for the preparation ophthalmic lens comprising one or more composite particles of the present disclosure;

a polymerizable monomer; and a catalyst suitable for initiating polymerization of the polymerizable monomer.

In another aspect, the present disclosure includes a sol-gel composition comprising one or more composite particles of the present disclosure and a sol-gel monomer.

In another aspect, the present disclosure includes the use of a composite particle of the present disclosure in a sol-gel ophthalmic lens coating.

In another aspect, the present disclosure includes the use of a free radical scavenger for the prevention of photo-bleaching of a dye in a sol-gel composition.

In another aspect, the present disclosure includes one or more composite particles of the present disclosure for use in a sol-gel ophthalmic lens coating.

BRIEF DESCRIPTION OF DRAWINGS

The embodiments of the disclosure will now be described in greater detail with reference to the attached drawings in which.

Figure 1:
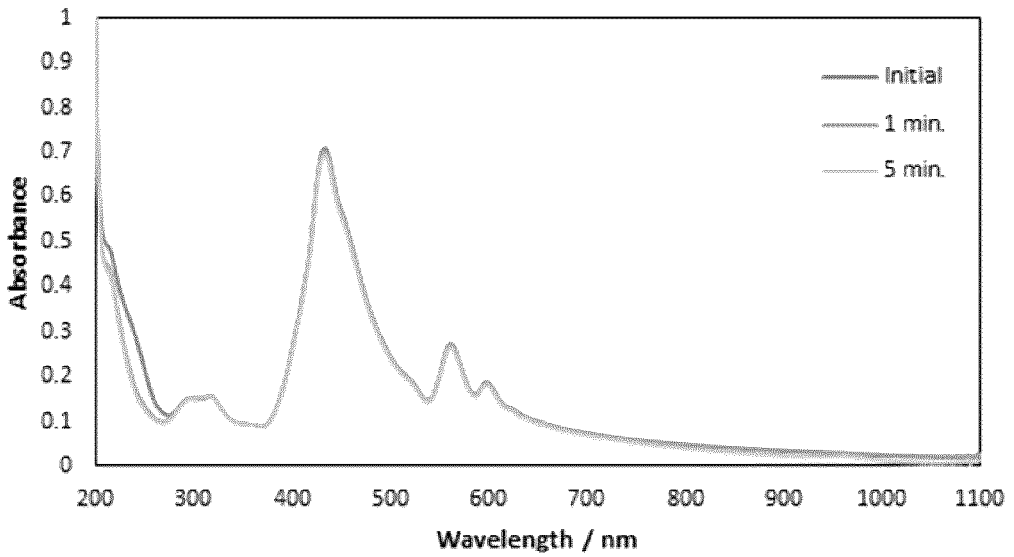
FIG. 1 shows a graph of absorbance as a function of wavelength for a composition comprising zinc (II) 5,10,15,20-(tetraphenyl)porphyrin free dye in solution exposed to UV light for 5 minutes.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should be given the broadest interpretation consistent with the description as a whole.

DESCRIPTION OF VARIOUS EMBODIMENTS

I. Definitions

Unless otherwise indicated, the definitions and embodiments described in this and other sections are intended to be applicable to all embodiments and aspects of the present disclosure herein described for which they are suitable as would be understood by a person skilled in the art.

The term "and/or" as used herein means that the listed items are present, or used, individually or in combination. In effect, this term means that "at least one of" or "one or more" of the listed items is used or present. The term "and/or" with respect to pharmaceutically acceptable salts and/or solvates thereof means that the compounds of the disclosure exist as individual salts and hydrates, as well as a combination of, for example, a solvate of a salt of a compound of the disclosure.

As used in the present disclosure, the singular forms "a", "an" and "the" include plural references unless the content clearly dictates otherwise. For example, an embodiment including "a compound" should be understood to present certain aspects with one compound, or two or more additional compounds.

In embodiments comprising an "additional" or "second" component, such as an additional or second compound, the second component as used herein is chemically different from the other components or first component. A "third" component is different from the other, first, and second components, and further enumerated or "additional" components are similarly different.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The term "aq." as used herein refers to aqueous.

The term "Zn (II) TPP" or "Zinc (II) 5,10,15,20-(tetraphenyl)porphyrin" as used herein refers to zinc;5,10,15,20-tetraphenylporphyrin-22,24-diode.

The term "RBB" or "Remazol Brilliant Blue R" as used herein refers to Disodium 1-amino-9,10-dioxo-4-{3-[2-(sulfonatooxy)ethane-1-sulfonyl]anilino}-9,10-dihydroanthracene-2-sulfonate.

The term "Sudan Blue (II)" as used herein refers to 1,4-bis(butylamino)anthraquinone.

The term "Quinizarin Blue" as used herein refers to 1-Hydroxy-4-(4-methylanilino)anthracene-9,10-dione The terms "BPO" or "benzoyl peroxide" as used herein refer to benzoic peroxyanhydride.

The term "nanoparticles" as used herein refers to particles of any shape (sphere, rod, string, etc.) having a size in the range of 1 nm to 10 μm, for example in the range of 10 nm to 800 nm, as measured by light scattering using nanoparticle tracking analysis, or electron microscopy. For example, the nanoparticles of the present disclosure are synthetic polymer-based.

The term "CR39" as used herein refers to the thermosetting plastic resin Columbia Resin #39, which is an allyl diglycol carbonate polymer.

The term "BHT" as used herein refers to butylated hydroxytoluene.

The term "Hi-Gard™ 1090S" as used herein refers to a commercially available sol gel ophthalmic lens coating solution.

The term "EDC" as used herein refers to 1-(3-dimethylaminopropyl)-3-ethylcarbodiimide hydrochloride.

The terms "THF" and "tetrahydrofuran" as used herein refer to oxolane.

The term "HEPES" as used herein refers to 2-[4-(2-hydroxyethyl)piperazin-1-yl]ethane-1-sulfonic acid.

II. Composite Particles and Compositions of the Disclosure

Accordingly, in one aspect, the present disclosure includes a composite particle comprising a dye having an absorbance in the range of from the ultraviolet (UV) region to the infrared (IR) region of the electromagnetic spectrum;

a free radical scavenger; and an amphiphilic block copolymer encapsulating the dye and the free radical scavenger.

In some embodiments, the dye is a laser or an absorber dye.

In some embodiments, the dye has an absorbance in a region selected from the UV region, the visible region, the infrared region, and combinations thereof. In some embodiments, the dye is a pigment, a coloured dye, a colourless dye, or mixtures thereof. In some embodiments, the dye has an absorbance in a region selected from the blue region, the green region, the red region, and combinations thereof. In some embodiments, the dye has an absorbance in the blue region. In some embodiments, the dye has an absorbance in the region of 380 nm to 500 nm. In some embodiments, the dye has an absorbance in the region of 410 nm to 450 nm. In some embodiments, the dye has an absorbance in the region of 500 nm to 700 nm.

In some embodiments, the dye is hydrophobic. In some embodiments the dye is hydrophilic. It will be appreciated that the nature of the dye will be selected based on the specific target application. For example, the selected dye will be hydrophilic if the composite particle is to be used in a hydrophobic environment. Alternatively, the selected dye will be hydrophobic if the composite particle is to be used in a hydrophilic environment.

In some embodiments, the dye is selected from coumarins, fluoresceins, rhodamines, eosins, pyrromethenes, cyanines, carbocyanines, flavins, oxazines, carbazines, stilbenes, diphenylstilbenes, oxazols, diphenyls, terphenyls, quaterphenyls, polyphenyls, phenyloxazones, phenoxazoniums, pyridines, pyridiniums, carotenoids, retinoids, porphyrins, phthalocyanines, benzophenones, metal oxides, benzotriazoles, tocopherols, tocotrienols, anthracenes, perylene, polycyclic aromatic hydrocarbons (PAH), polyenes, corrins, chlorins, corphins, indolenines, chlorophylls, azo dyes, polymethines, diarylmethanes, triarylmethanes, polyenes, anthracinediones, pyrazolones, anthraquinones, pyrans, phenothiazines, triazines, oxalanilides, acridines, benzanthrones, xanthenes, and combinations thereof.

In some embodiments, the dye is selected from anthraquinones, BODIPY, AzaBODIPY, tetraphenylporphyrins, phthalocyanines, naphthalocyanines, coumarins, benzotriazoles, tocopherols, tocotrienols, carotenoids, anthracenes, perylenes, metal oxides, xanthenes, azo dyes, and combinations thereof.

In some embodiments, the dye is selected from 1,3,5,7-Tetramethyl-8-(4-hydroxyphenyl)BODIPY, 1,7-(Di-4,N,N-dimethylaminophenyl)-3,5-(di-4-bromophenyl)AZA-BODIPY, 2,3,7,8,12,13,17,18-(Octabromo)-5,10,15,20-(tetraphenyl)Porphyrin, Zn (II) 5,10,15,20-Tetraphenyl-21H,23H-porphyrin (Zn (II) TPP), Zinc(II) 2,9,16,23-(tetra-nitro)Phthalocyanine, Coumarin 153, 2-(2'hydroxy-5'methacryloxyethylphenyl)-2H-benzotriazole, vitamin E, β-carotene, 9,10-Diphenylanthracene, perylene, chromium (III) oxide, P-Quaterphenyl, Vanadyl 2,3-naphthalocyanine, Sudan blue (II), Quinizarin Blue, Remazol Brilliant Blue, Reactive Yellow 15, Eosin Y, Fluorescein, and combinations thereof.

In some embodiments, the dye is selected from porphyrins, anthraquinones, and azo dyes.

In some embodiments, the dye is selected from Zn (II) 5,10,15,20-Tetraphenyl-21H,23H-porphyrin (Zn (II) TPP), Sudan blue (II), Remazol Brilliant Blue, Quinizarin Blue, Reactive Yellow 15, and combinations thereof.

In some embodiments, the dye is a dye derivative. The dye derivative can contain a modification or alteration to an existing dye to change the physical and chemical properties of said dye.

In some embodiments, the free radical scavenger is an antioxidant agent. In some embodiments, the free radical scavenger is selected from butylated hydroxytoluene, α-tocopherol, ascorbic acid and mixtures thereof.

In some embodiments, the free radical scavenger is selected from α-tocopherol, ascorbic acid, and mixtures thereof.

In some embodiments, it will be appreciated that the nature of the free radical scavenger will be selected for complementary polarities with the dye. For example, a hydrophobic free radical scavenger will be selected with a hydrophobic dye, and a hydrophilic free radical scavenger will be selected with a hydrophilic dye. As such, the mixtures herein defined will include free radical scavengers having similar polarities. Without being bound to theory, the complementary polarities will allow for the free radical scavenger to be closely retained with the dye in the composite particle.

In some embodiments, the amphiphilic block copolymer is a diblock copolymer or a triblock copolymer.

In some embodiments, the amphiphilic block copolymer is a diblock copolymer.

In some embodiments, the amphiphilic block copolymer is selected from a poly(alkyl acrylate)-based copolymer, a poly(alkyl methacrylate)-based copolymer, a poly(acrylic acid)-based copolymer, a poly(methacrylic acid)-based copolymer, a polydiene-based copolymer, a poly(N-isopropylacrylamide)-based copolymer, a polyethylene glycol-based copolymer, a poly(methylene indane)-based copolymer, a polysiloxane-based copolymer, a polystyrene-based copolymer, a substituted polystyrene-based copolymer, a poly(vinyl pyridine)-based copolymer, a poly(vinyl alcohol) based copolymer, a poly(alkyl acrylic acid)-based copolymer, a poly(alkylene oxide)-based copolymer, a poly(dialkyl siloxane)-based copolymer, a poly(olefin)-based copolymer, a poly(alkylene oxide diacrylate)-based copolymer, a poly(butanediol diacrylate)-based copolymer, and combinations thereof.

In some embodiments, the amphiphilic block copolymer is a poly(alkyl acrylate)-based copolymer, a poly(alkyl methacrylate)-based copolymer, a poly(acrylic acid)-based copolymer, a poly(methacrylic acid)-based copolymer, a polydiene-based copolymer, a polyolefin-based copolymer, a polyethylene glycol-based copolymer, a polysiloxane-based copolymer, a poly(styrene)-based copolymer, a poly(vinyl alcohol) based copolymer, a poly(dialkyl siloxane)-based copolymer, or combinations thereof.

In some embodiments, the amphiphilic block copolymer is a poly(methyl acrylate)-based copolymer, a poly(n-butyl acrylate)-base copolymer, a poly(methyl methacrylate)-based copolymer, a poly(tert-butyl methacrylate)-based copolymer, a poly(acrylic acid)-based copolymer, a poly(methacrylic acid)-based copolymer, a poly(1,2-butadiene)-based copolymer, a poly(1,4-butadiene)-based copolymer, a poly(styrene)-based copolymer, a poly(dimethyl siloxane)-based copolymer, a poly(vinyl alcohol) based copolymer, a poly(propylene oxide)-based copolymer, or combinations thereof.

In some embodiments, the amphiphilic block copolymer is selected from poly(1,2-butadiene)-b-poly(acrylic acid), poly(1,2-butadiene)-b-poly(ethylene oxide), poly(1,2-butadiene)-b-poly(methacrylic acid), poly(1,2-butadiene)-b-poly(methyl methacrylate), poly(1,2-butadiene)-b-poly(vinyl alcohol), poly(1,2-butadiene-co-1,4-butadiene)-b-poly(acrylic acid), poly(1,2-butadiene-co-1,4-butadiene)-b-poly(ethylene oxide), poly(1,2-butadiene-co-1,4-butadiene)-b-poly(methacrylic acid), poly(1,2-butadiene-co-1,4-butadiene)-b-poly(vinyl alcohol), poly(1,4-butadiene)-b-poly(acrylic acid), poly(1,4-butadiene)-b-poly(ethylene oxide), poly(1,4-butadiene)-b-poly(methacrylic acid), poly(1,4-butadiene)-b-poly(vinyl alcohol), poly(dimethyl siloxane)-b-poly(acrylic acid), poly(dimethyl siloxane)-b-poly(ethylene oxide), poly(dimethyl siloxane)-b-poly(methacrylic acid), poly(dimethyl siloxane)-b-poly(n-butyl acrylate), poly(ethylene oxide)-b-poly(butadiene), poly(ethylene oxide)-b-poly(dimethyl siloxane), poly(ethylene oxide)-b-poly(methyl methacrylate), poly(ethylene oxide)-b-poly(n-butyl acrylate), poly(ethylene oxide)-b-poly(styrene), poly(ethylene oxide)-b-poly(tert-butyl methacrylate), poly(methyl methacrylate)-b-poly(acrylic acid), poly(methyl methacrylate)-b-poly(dimethyl siloxane), poly(methyl methacrylate)-b-poly(ethylene oxide), poly(methyl methacrylate)-b-poly(methacrylic acid), poly(methyl methacrylate)-b-poly(styrene), poly(n-butyl acrylate)-b-poly(acrylic acid), poly(propylene oxide)-b-poly(butadiene), poly(propylene oxide)-b-poly(dimethyl siloxane), poly(propylene oxide)-b-poly(methyl methacrylate), poly(propylene oxide)-b-poly(n-butyl acrylate), poly(propylene oxide)-b-poly(styrene), poly(ethylene oxide)-b-poly(propylene oxide)-b-poly(ethylene oxide), poly(propylene oxide)-b-poly(tert-butyl methacrylate), poly(vinyl alcohol)-b-poly(butadiene), poly(vinyl alcohol)-b-poly(dimethyl siloxane), poly(vinyl alcohol)-b-poly(methyl methacrylate), poly(vinyl alcohol)-b-poly(n-butyl acrylate), poly(vinyl alcohol)-b-poly(styrene), poly(vinyl alcohol)-b-poly(tert-butyl methacrylate), poly(1,2-butadiene)$_{15000}$-b-poly(acrylic acid)$_{6500}$, poly(1,4-butadiene)$_{9000}$-b-poly(acrylic acid)$_{3500}$, poly(dimethyl siloxane)$_{5000}$-b-poly(ethylene oxide)$_{2100}$, poly(dimethyl siloxane)$_{8000}$-b-poly(acrylic acid)$_{8000}$, poly(methyl methacrylate)$_{3000}$-b-poly(ethylene oxide)$_{3000}$, poly(methyl methacrylate)$_{7400}$-b-poly(acrylic acid)$_{24300}$, poly(n-butyl acrylate)$_{7500}$-b-poly(acrylic acid)$_{5500}$, poly(styrene)$_{1300}$-b-poly(ethylene oxide)$_{5600}$, poly(vinyl alcohol)$_{2300}$-b-poly(methyl methacrylate)$_{25000}$, poly(vinyl alcohol)$_{2500}$-b-poly(styrene)$_{12500}$, poly(ethylene oxide)$_{4450}$-b-poly(propylene oxide)$_{3250}$-b-poly(ethylene oxide)$_{4450}$ and combinations thereof.

In some embodiments, the amphiphilic block copolymer is crosslinked.

In some embodiments, the amphiphilic block copolymer is crosslinked using a crosslinking method selected from dialdehyde crosslinking, diamine crosslinking, diol crosslinking, ester crosslinking, free radical initiated alkene polymerization, quaternary-ammonium crosslinking, silane crosslinking, trialdehyde crosslinking, triamine crosslinking, triol crosslinking, urethane crosslinking, acrylate crosslinking, metal chelation crosslinking and combinations thereof.

In some embodiments, the amphiphilic block copolymer is crosslinked by one or more crosslinking agent.

In some embodiments, the silane crosslinking is done with silanes selected from monoalkyl silicates, dialkyl silicate, trialkyl silicates, tetraalkoxy orthosilicates, fumed silica, and combinations thereof. In some embodiments, the tetraalkoxy silicates are selected from tetramethyl orthosilicate (TMOS), tetraethyl orthosilicate (TEOS), and combinations thereof.

In some embodiments, the free radical initiated alkene polymerization is initiated with thermally activated and/or photoactivated free radical initiator, optionally the free radical initiator is selected from nitrile-based initiators, peroxide-based initiators and combinations thereof. In some embodiments, the free radical initiator is selected from azobisisobutyronitrile (AIBN), diisopropyl peroxydicarbonate (IPP), benzoyl peroxide (BPO), 1-hydroxycyclohexyl phenyl ketone, 2-Hydroxy-2-methylpropiophenone, trimethylpropane tri(3-mercaptopropionate), and combinations thereof.

In some embodiments, the metal chelation crosslinking is done with a transition metal.

In some embodiments, the transition metal is selected from Fe, Zn, Cu, Ru, Ni, Eu, Au, Ag, Pd, Pt, Cr, and combinations thereof.

In some embodiments, the metal chelation crosslinking is performed using heat, addition of a base, addition of a buffer system, or combinations thereof.

In some embodiments, the amphiphilic block copolymer is crosslinked by more than one crosslinking method.

In some embodiments, the amphiphilic block copolymer is crosslinked using silane crosslinking and free radical initiated alkene polymerization crosslinking.

In some embodiments, the amphiphilic block copolymer is crosslinked using TEOS and AIBN.

In some embodiments, the amphiphilic block copolymer is selected from poly(1,2-butadiene)-b-poly(acrylic acid) crosslinked with AIBN, poly(1,2-butadiene)-b-poly(acrylic acid) crosslinked with fumed silica, poly(1,2-butadiene)-b-poly(acrylic acid) crosslinked with TEOS, poly(1,2-butadiene)-b-poly(acrylic acid) crosslinked with TEOS and AIBN, poly(1,2-butadiene)$_{15000}$-b-poly(acrylic acid)$_{6500}$ crosslinked with AIBN, poly(1,2-butadiene)$_{15000}$-b-poly(acrylic acid)$_{6500}$ crosslinked with fumed silica, poly(1,2-butadiene)$_{15000}$-b-poly(acrylic acid)$_{6500}$ crosslinked with TEOS, or poly(1,2-butadiene)$_{15000}$-b-poly(acrylic acid)$_{6500}$ crosslinked with TEOS and AIBN.

In some embodiments, the composite particle has a diameter in the nanometer to micrometer range.

In some embodiments, the diameter of the composite particle is about 1 nm to about 10 μm.

In some embodiments, the diameter of the composite particle is about 10 nm to about 800 nm.

In some embodiments, the composite particle comprises about 0.01% w/w to about 90% w/w of the dye.

In some embodiments, the composite particle comprises about 0.1% w/w to about 50% w/w of the dye.

In some embodiments, the composite particle comprises about 1% w/w to about 25% w/w of the dye.

In some embodiments, the composite particle comprises about 0.01% w/w to about 90% w/w of the free radical scavenger.

In some embodiments, the composite particle comprises about 10% w/w to about 90% w/w of the free radical scavenger.

In some embodiments, the composite particle comprises about 50% w/w to about 90% w/w of the free radical scavenger.

In some embodiments, the composite particle of the present disclosure comprises

Zn (II) TPP,

α-tocopherol; and (1,2)Poly(butadiene)$_{15,000}$-b-Poly(acrylic acid)$_{6,500}$.

In some embodiments, the composite particle of the present disclosure comprises 0.2% w/w to about 5% w/w Zn (II) TPP;

50% w/w to about 95% w/w α-tocopherol; and

1% w/w to about 25% w/w (1,2)Poly(butadiene)$_{15,000}$-b-Poly(acrylic acid)$_{6,500}$.

In some embodiments, the composite particle of the present disclosure comprises

RBB;

Ascorbic Acid; and

Poly(dimethyl siloxane)$_{5,000}$-b-Poly(ethylene oxide)$_{2,100}$.

In some embodiments, the composite particle of the present disclosure comprises 0.2% w/w to about 5% w/w RBB;

50% w/w to about 95% w/w Ascorbic Acid; and

1% w/w to about 25% w/w Poly(dimethyl siloxane)$_{5,000}$-b-Poly(ethylene oxide)$_{2,100}$.

In some embodiments, the composite particle of the present disclosure comprises

Zn (II) TPP;

α-tocopherol; and

Poly(styrene)$_{1,600}$-b-Poly(ethylene oxide)$_{5,000}$.

In some embodiments, the composite particle of the present disclosure comprises about 1% w/w to about 2% w/w Zn (II) TPP;

about 75% w/w to about 85% w/w α-tocopherol; and about 10% w/w to about 20% w/w Poly(styrene)$_{1,600}$-b-Poly(ethylene oxide)$_{5,000}$.

In some embodiments, the composite particle of the present disclosure comprises

Zn (II) TPP;

α-tocopherol; and (1,4)Poly(butadiene)$_{9,000}$-b-Poly(acrylic acid)$_{3,500}$.

In some embodiments, the composite particle of the present disclosure comprises about 1% w/w to about 2% w/w Zn (II) TPP;

about 75% w/w to about 85% w/w α-tocopherol; and about 10% w/w to about 20% w/w (1,4)Poly(butadiene)$_{9,000}$-b-Poly(acrylic acid)$_{3,500}$.

In some embodiments, the composite particle of the present disclosure comprises

Zn (II) TPP;

α-tocopherol; and (1,2)Poly(butadiene)$_{31,500}$-b-Poly(methyl methacrylate)$_{21,000}$.

In some embodiments, the composite particle of the present disclosure comprises about 1% w/w to about 2% w/w Zn (II) TPP;

about 75% w/w to about 85% w/w α-tocopherol; and about 10% w/w to about 20% w/w (1,2)Poly(butadiene)$_{31,500}$-b-Poly(methyl methacrylate)$_{21,000}$.

In some embodiments, the composite particle of the present disclosure comprises

Sudan blue (II);

α-tocopherol; and (1,2)Poly(butadiene)$_{15,000}$-b-Poly(acrylic acid)$_{6,500}$.

In some embodiments, the composite particle of the present disclosure comprises about 0.25% w/w to about 2% w/w Sudan blue (II);

about 80% w/w to about 95% w/w α-tocopherol; and about 5% w/w to about 15% w/w (1,2)Poly(butadiene)$_{15,000}$-b-Poly(acrylic acid)$_{6,500}$.

In some embodiments, the composite particle that has a maximum UV-Vis absorbance after exposure to peroxide for 15 min, 30 min, 90 min, 3 hours, 5 hours, 7 hours, or 10 hours that is at least 50%, 60%, 70%, 80%, or 90% of the maximum UV-Vis absorbance before the exposure to the peroxide.

In some embodiments, the maximum UV-Vis absorbance of the composite particle is substantially unchanged after exposure to peroxide for 15 min, 30 min, 90 min, 3 hours, 5 hours, 7 hours, or 10 hours.

In some embodiments, the peroxide is $H_2O_2$ or an organic peroxide. Optionally, the organic peroxide is benzoyl peroxide or diisopropyl peroxydicarbonate.

In another aspect, the present disclosure includes an ophthalmic lens monomer solution composition comprising a composite particle of the present disclosure;

a polymerizable monomer; and a catalyst suitable for initiating polymerization of the polymerizable monomer.

In some embodiments, the polymerizable monomer comprises an allyl monomer selected from ethylene glycol bis(allyl carbonate), oligomers of diethylene glycol bis(allyl carbonate), diethylene glycol bis(allyl carbonate), bisphenol A bis(allyl carbonate), oligomers of ethylene glycol bis(allyl carbonate), diallyl phthalates, diallyl terephthalate, and mixtures thereof.

In some embodiments, the polymerizable monomer is further comprises a second monomer selected from [alpha]-chlorostyrene, divinylbenzene, 2,2-bis[4-((meth)-acryloxypolyethoxy)phenyl]propane, methyl (meth)acrylate, n-butyl (meth)acrylate, styrene, n-hexyl (meth)acrylate, cyclohexyl (meth)acrylate, 2-ethylhexyl (meth)acrylate, chloromethyl-styrene, methoxydiethylene glycol (meth)acrylate, methoxypolyethylene glycol (meth)acrylate, vinyltoluene, triethylene glycol di(meth)acrylate, polyethylene glycol di(meth)acrylate, methylstyrene, stearyl (meth)acrylate, lauryl (meth)acrylate, phenyl (meth)acrylate, glycidyl (meth)acrylate and benzyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate, 3-chloro-2-hydroxypropyl (meth)acrylate, 4-hydroxybutyl (meth)acrylate; di(meth)acrylates such as ethylene glycol di(meth)acrylate, diethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2-hydroxy-1,3-di(meth)acryloxy-propane, 2,2-bis[4-((meth)acryloxyethoxy)phenyl]propane, 2,2-bis[4-((meth)acryloxydiethoxy)phenyl]propane, trimethylolpropane, tri(meth)acrylate, tetramethylolmethane tri(meth)acrylate, tetramethylolmethane tetra(meth)acrylate, and combinations thereof.

In some embodiments, the second monomer is suitable for polymerization with the first allyl monomer.

In some embodiments, the polymerizable monomer comprises about 1% w/w to about 75% w/w of the second monomer.

In some embodiments, the polymerizable monomer comprises about 1% w/w to about 40% w/w of the second monomer.

In some embodiments, the polymerizable monomer comprises about 2% w/w to about 15% w/w of the second monomer.

In some embodiments, the polymerizable monomer comprises allyl diglycol carbonate.

In some embodiments, the catalyst is selected from peroxide, organic azo compound, organotin compound, and mixtures thereof.

In some embodiments, the organic peroxide is selected from di-t-butyl peroxide, methyl ethyl ketone peroxide, diisopropyl peroxide, methyl isopropyl ketone peroxide, methyl isobutyl ketone peroxide, acetylacetone peroxide, cyclohexane peroxide, diisopropyl peroxydicarbonate, bis (4-t-butylcyclohexyl) peroxydicarbonate, di-sec-butyl peroxydicarbonate, isopropyl-sec-butylperoxydicarbonate, t-hexyl peroxy-2-ethylhexanoate, benzoyl peroxide, t-butyl peroxy-2-ethylhexanoate, acetyl peroxide, lauroyl peroxide, 2,2-di(tert-butylperoxy)butane, 1,1-bis(tert-butylperoxy)3, 3,5-trimethylcyclohexane, 1,1-di(tert-butylperoxy)cyclo-hexane, and mixtures thereof.

In some embodiments, the peroxide is selected from benzoyl peroxide, diisopropyl peroxydicarbonate, tert-butylperoxy 2-ethylhexyl carbonate, 1,1-bis(tert-amylper-oxy)cyclohexane, hydrogen peroxide, and combinations thereof.

In some embodiments, the organic azo compound is selected from 2,2'-azobisisobutyronitrile, 2,2'-azobis(2-methylbutyronitrile), 2,2'-azobis(2,4-dimethylvaleronitrile), 4,4'-azobis(4-cyanopentanoic acid), dimethyl 2,2'-azobis(2-methylpropionate), and mixtures thereof.

In some embodiments, the organotin compound is selected from dibutyltin chloride, dimethyltin chloride, and mixtures thereof.

In some embodiments, the composite particle is dispersed in the polymerizable monomer.

In some embodiments, the ophthalmic lens monomer composition of the present disclosure comprises about 30% w/w to about 99% w/w of the polymerizable monomer.

In some embodiments, the ophthalmic lens monomer composition the present disclosure comprises about 60% w/w to about 99% w/w of the polymerizable monomer.

In some embodiments, the ophthalmic lens monomer composition of the present disclosure comprises about 80% w/w to about 98% w/w of the polymerizable monomer.

In some embodiments, the ophthalmic lens monomer composition of the present disclosure comprises about 90% w/w to about 97% w/w of the polymerizable monomer.

In some embodiments, the ophthalmic lens monomer composition of the present disclosure comprises about 0.001% w/w to about 5% w/w of the catalyst.

In some embodiments, the ophthalmic lens monomer composition of the present disclosure comprises about 0.01% w/w to about 3% w/w of the catalyst.

In some embodiments, the ophthalmic lens monomer composition of the present disclosure comprises about 0.05% w/w to about 1% w/w of the catalyst.

In some embodiments, the ophthalmic lens monomer composition of the present disclosure comprises about 0.01% w/w to about 10% w/w of the composite particle.

In some embodiments, the ophthalmic lens monomer composition of the present disclosure comprises about 0.05% w/w to about 1% w/w of the composite particle.

In some embodiments, the ophthalmic lens monomer composition of the present disclosure comprises a composite particle of the present disclosure;

allyl diglycol carbonate; and benzoyl peroxide or diisopropyl peroxydicarbonate.

In some embodiments, the ophthalmic lens monomer composition of the present disclosure comprises about 0.001% w/w to about 10% w/w of the composite particle of the present disclosure;

about 85% w/w to about 99.999% w/w of allyl diglycol carbonate; and about 0% w/w to about 3.5% w/w of benzoyl peroxide or diisopropyl peroxydicarbonate.

In some embodiments, the ophthalmic lens monomer composition of the present disclosure further comprises a surfactant or cryoprotectant.

In some embodiments the surfactant is selected from a non-ionic surfactant, a cationic surfactant, an anionic surfactant, and a zwitterionic surfactant.

In some embodiments the surfactant is selected from polyoxyethylene glycol octylphenol ethers, polyoxyethylene glycol alkylphenol ethers, polyoxyethylene glycol sorbitan alkyl esters, sorbitan alkyl esters, block copolymers of polyethylene glycol and polypropylene glycol, dioctyl sodium sulfosuccinates, perfluorooctanesulfonates, linear alkylbenzene sulfonates, sodium lauryl ether sulfates, lignosulfonates, sodium stearates, benzalkonium chlorides, cetylpyridinium chlorides, benzethonium chlorides, alkyltrimethylammonium salts, cetyl trimethylammonium bromides, cetyl trimethylammonium chlorides, and betaines.

In some embodiments the cryoprotectant is selected from glycols, ethylene glycols, dimethyl sulfoxides, and sugars.

In some embodiments, the cryoprotectant and surfactant is selected from polyethylene glycol 4000, polyethylene glycol 400, and polyethylene glycol 20000, 2-[4-(2,4,4-trimethylpentan-2-yl)phenoxy]ethanol, sodium bis(2-ethyl-hexyl) sulfosuccinate, or mixtures thereof.

In some embodiments, the ophthalmic lens monomer composition of the present disclosure comprises about 50% to about 95% surfactant or cryoprotectant.

In another aspect, the present application includes an ophthalmic lens comprising a composite particle of the present disclosure.

In some embodiments, the ophthalmic lens of the present disclosure further comprises a polymer obtained from a polymerizable monomer as described herein.

Without wishing to be bound by theory, encapsulating the dye in a nanoparticle has several effects. For example, it shields the dye from potential interaction with the monomer or catalyst, which could interact negatively with the dye. For example, the monomer or the catalyst could lead to degradation of the dye.

Encapsulation of both a free radical scavenger and a dye in the same nanoparticle allows protection of the dye at a low dye concentration, since both the dye and the free radical scavenger can be trapped in a single particle. This allows a high local concentration of free radical scavenger in the vicinity of the dye.

It can be appreciated that encapsulated dyes are more photostable to UV and HEV light. Further, the identity of the encapsulated dye does not affect the polymerization of the monomer solution. The nanoparticle shell is unchanged by the encapsulated materials, allowing a wide range of dyes to be introduced to the monomer without changing the solution conditions.

In some embodiments, the ophthalmic lens monomer consists essentially of, or consists of an allyl oligomer or monomer, one or more composite particles of the present disclosure, and a peroxide catalyst. In some embodiments, the allyl oligomer or monomer is in solution form. In some embodiments, the one or more composite particles are dispersed in the allyl monomer or oligomer. In some embodiments, the dispersion of the one or more composite particles in the allyl monomer or oligomer is homogenous. In some embodiments, the peroxide catalyst is added to the dispersion of the one or more composite particles in the allyl monomer or oligomer.

It can be appreciated that the polymerizable monomer can polymerize to form a resin. In some embodiments, the polymerizable monomer can comprise one or more copolymers of thermosetting resins copolymers. In some embodiments, the polymerizable monomer can comprise allyl esters, epoxy, sulphide, thio(meth)acrylic acid and esters, allyl carbonates, (meth)acrylic acid and esters, cyclic olefin copolymers such as urethane and thiourethane, disulphide or episulfide, thiol and isocyanate, or mixtures thereof. In some embodiments, the polymerizable monomer can comprise thermoplastic resin copolymers. In some embodiments, the polymerizable monomer can comprise a polycarbonate, polyimide, polysulfone, poly(methyl(meth)acrylate), polyamide, cellulose triacetate, polyethylene terephthalate, or combinations thereof.

In some embodiments, the composite particle comprises a core and a shell surrounding the core. In some embodiments, the dye is located in the core. In some embodiments, the core is chosen to interact favorably with the dye. In some embodiments, the shell is chosen to shield the core from the surrounding environment, while interacting favorably with the environment to increase particle solubility.

In some embodiments, the composite particle is substantially monodispersed. It can be appreciated that monodispersity of the composite particle contributes to homogeneity of the suspension of the composite particle in the ophthalmic lens monomer composition. Accordingly, in some embodiments, the dye and monomer solution are effectively homogenous. In some embodiments, the ophthalmic lens monomer composition is a substantially homogenous suspension.

In some embodiments, the dye is a laser dye or an absorber dye. In some embodiments, the dye is a laser dye. The person skilled in the art would appreciate that laser dyes absorb at shorter wavelengths and emit at longer wavelengths. In some embodiments, the dye is an absorber dye.

In some embodiments, the dye is a highly coloured dye.

In some embodiments, the amphiphilic block copolymer is transparent in the visible range of the electromagnetic spectrum.

In some embodiments, the composite particle of the present disclosure can be of various types. In some embodiments, the composite particles of the present disclosure are a core shell nanoparticle.

In some embodiments, the amphiphilic block copolymer is selected from an acrylic polymer, a vinylic polymer, an allylic polymer, and mixtures thereof.

In some embodiments, the amphiphilic block copolymer is a vinylic polymer. In some embodiments, the amphiphilic block copolymer is a copolymer of butadiene and acrylic acid.

The composite particle of the present disclosure can be prepared by solvent evaporation, nanoprecipitation, emulsion polymerization, microfluidic mixing, interfacial polymerization, ultrasonication, spray drying and/or coacervation. In some embodiments, the composite particle of the present disclosure is prepared by microfluidic mixing. In some embodiments, the composite particle of the present disclosure is prepared by nanoprecipitation.

In some embodiments, the composite particle of the present disclosure is prepared by flash nanoprecipitation. For example, the flash nanoprecipitation is done by mixing a solvent such as tetrahydrofuran, and the dye, the free radical scavenger, and the amphiphilic copolymer. The resulting mixture is then mixed with an antisolvent such as water, for example using a microfluidic system.

In another aspect, the present disclosure includes a kit for the preparation ophthalmic lens comprising one or more composite particles of the present disclosure;
   a polymerizable monomer; and
   a catalyst suitable for initiating polymerization of the polymerizable monomer.

In some embodiments, the polymerizable monomer is as described herein. In some embodiments, the catalyst is as described herein.

In some embodiments, the one or more composite particles of the kit of the present disclosure are mixed with polyethylene glycol, optionally polyethylene glycol 4000.

It can be appreciated that the composite particle and the composition of the present disclosure can be incorporated into a thin-film coating applied onto an ophthalmic lens. The thin-film coating can be a coating commonly used on ophthalmic lens. For instance, the coating can be a polymer-based coating. For example, the coating can be a polysiloxane-based coating. In some embodiments, the coating can be a sol-gel coating.

In another aspect, the present disclosure includes a sol-gel composition comprising one or more composite particles of the present disclosure and a polymerizable sol-gel monomer.

In another aspect, the present disclosure includes one or more composite particles of the present disclosure for use in a sol-gel ophthalmic lens coating.

In another aspect, the present disclosure includes one or more composite particles of the present disclosure for use in thin-film applications to extend the lifetime of dyes against photodegradation.

In some embodiments, the polymerizable sol-gel monomer is selected from epoxysilanes, alkoxysilanes, and combinations thereof.

In some embodiments, the epoxysilanes are selected from γ-glycidoxypropyltriethoxysilane, γ-glycidoxypropyltrimethoxysilane, γ-glycidoxypropyldiethoxysilane, γ-glycidoxypropyldimethoxysilane, and combination thereof.

In some embodiments, the alkoxysilanes are selected from tetramethylorthosilicate (TMOS), tetraethylorthosilicate (TEOS), Dimethyldimethoxysolane (DMDMS), Diethyldimethoxysilane (DEDMS), Dimethyldiethoxysilane (DMDES), Diethyldiethoxysilane (DEDES), and combinations thereof.

It can be appreciated that the sol-gel composition of the present disclosure can be applied onto an ophthalmic lens using common methods known in the art. For example, the polymerizable sol-gel monomer and the composite particle can be mixed with one or more polar solvents and the resulting mixture applied onto the ophthalmic lens. Accordingly, in some embodiments, with the sol-gel composition of the present disclosure further comprises one or more polar solvents. In some embodiments, the one or more polar solvents are selected from ethanol, methanol, water, and mixtures thereof.

It can be appreciated that the polymerizable sol-gel monomers can hydrolyze to cure and form a thin film. For example, the sol-gel composition of the present disclosure can be applied on an ophthalmic lens and the sol-gel composition can be cured to form a film on the ophthalmic lens. It can be appreciated that the sol-gel composition of the present disclosure can be cured and polymerized using methods known in the art. For example. the curing process may optionally be initiated in the presence of metal halides or perchlorates. It can be appreciated that common sol-gel coating solutions for ophthalmic lenses can comprise two or more miscible liquids, e.g., ethanol and water. For example, the sol-gel process can use inorganic or metal organic compounds as raw ingredients. In aqueous or organic solvents, these compounds are hydrolyzed and condensed to form inorganic polymers composed of M-O-M bonds. For inorganic compounds, hydrolysis proceeds by the removal of a proton from an aquo ion $[MONH_2N]^{Z+}$ to form a hydroxo (M-OH) or oxo (M=O) ligand. Condensation reactions involving the hydroxo ligands result in inorganic polymers in which metal centers are bridged by oxygens or hydroxyls.

It can be appreciated that the sol-gel composition of the present disclosure can be applied to an ophthalmic lens using common methods known in the art. For example, the sol-gel composition can be applied using dip-coating and/or spin-coating methods.

In dip-coating, the substrate (e.g., an ophthalmic lens) is normally withdrawn vertically from the coating bath at a constant speed. The moving substrate entrains the liquid in a fluid mechanical boundary layer that splits in two above the liquid bath surface, returning the outer layer to the bath. Since the solvent is evaporating and draining, the fluid film acquires an approximate wedge-like shape that terminates in a well-defined drying line. When the receding drying line velocity equals the withdrawal speed, the process is steady state with respect to the liquid bath surface. For alcohol-rich fluids common to sol-gel dip-coating, steady state conditions are attained in several seconds.

Spin-coating differs from dip-coating in that the depositing film thins by centrifugal draining and evaporation. Spin-coating has four stages: deposition, spin-up, spinoff and evaporation, although for sol-gel coating, evaporation normally overlaps the other stages. An excess of liquid is dispensed on the surface during the deposition stage. In the spin-up stage, the liquid flows radially outward, driven by centrifugal force. In the spin-off stage, excess liquid flows to the perimeter and leaves as droplets. As the film thins, the rate of removal of excess liquid by spin-off slows down, because the thinner the film, the more viscous, and because the concentration of the non-volatile components increases, raising the viscosity. In the final stage, evaporation takes over as the primary mechanism of thinning. An advantage of spin-coating is that a film of liquid tends to become uniform in thickness during spin-off and, once uniform, tends to remain so, provided that the viscosity is not shear-dependent and does not vary over the substrate. This tendency is due to the balance between the two main forces: centrifugal force, which drives flow radially outward, and viscous force (friction), which acts radially inward.

III. Methods and Uses of the Disclosure

In another aspect, the present disclosure includes a method of preparing an ophthalmic lens monomer composition solution comprising providing a composite particle of the present disclosure; and mixing the composite particle with a polymerizable monomer, a catalyst suitable for initiating polymerization of the polymerizable monomer.

In some embodiments, the providing of the composite particle comprises preparing the composite particle by solvent evaporation, nanoprecipitation, emulsion polymerization, nanoprecipitation, microfluidic mixing, interfacial polymerization, spray drying or coacervation.

In some embodiments, the mixing comprises dispersing the composite particle and the catalyst in the polymerizable monomer.

In some embodiments, the polymerizable monomer is as described herein.

In some embodiments, the catalyst is as described herein.

In some embodiments, the ophthalmic lens monomer composition is an ophthalmic lens monomer composition of the present disclosure.

In some embodiments, the method of preparing the ophthalmic lens monomer composition further comprises mixing the composite particle with additional surfactants, optionally polyethylene glycol 4000, 400, and 20000. In some embodiments, the ophthalmic lens monomer composition includes 2-[4-(2,4,4-trimethylpentan-2-yl)phenoxy] ethanol, sodium bis(2-ethylhexyl) sulfosuccinate, or mixtures thereof.

In another aspect, the present application includes a method of preparing an ophthalmic lens comprising preparing an ophthalmic lens monomer solution of the present disclosure; and polymerizing the ophthalmic lens monomer solution.

In another aspect, the present disclosure includes a method of optical filtration in an ophthalmic lens comprising selectively blocking light radiation using one or more composite particles of the present disclosure.

In some embodiments, the light radiation is selected from infrared light, UV light, visible light, and combinations thereof.

In some embodiments, the light radiation is selected from blue light, red light, green light, and combinations thereof.

In some embodiments, the light radiation is selected from UV light, blue light, and combinations thereof.

In another aspect, the present disclosure includes a use of one or more composite particles of the present disclosure for selectively blocking light radiation in an ophthalmic lens.

In another aspect, the present disclosure includes a use of one or more composite particles of the present disclosure in the preparation of an ophthalmic lens monomer solution.

In another aspect, the present disclosure includes a use of one or more composite particles of the present disclosure in the preparation of an ophthalmic lens.

In another aspect, the present disclosure includes a use of a composite particle comprising an amphiphilic block copolymer, a dye, and a free radical scavenger in the prevention of degradation of the dye by a catalyst. In some embodiments, the catalyst is a peroxide. In some embodiments, the catalyst and the composite particle is comprised in an ophthalmic lens monomer composition.

It can be appreciated that assessing the degradation of the dye caused by the catalyst can be done by comparing the absorption spectrum of the composite particle of the present disclosure or the ophthalmic lens monomer composition of the present disclosure before addition of the catalyst, to the spectrum of the composite particle of the present disclosure or the ophthalmic lens monomer composition measured over time after the addition of the catalyst. The degree of change in the spectrum of the composite particle or of the ophthalmic lens monomer composition of the present disclosure correlates to the degree of degradation of the dye by the catalyst.

In another aspect, the present disclosure includes a use of a composite particle of the present disclosure in a sol-gel ophthalmic lens coating.

In another aspect, the present disclosure includes a use of a free radical scavenger for in the prevention of photo-bleaching of a dye in a sol-gel composition.

EXAMPLES

The following non-limiting examples are illustrative of the present disclosure.

General Methods and Materials

The peak absorbance is used to determine the relative concentration of dye.

The size of the composite particle is measured using either a standard light scattering method using a nanoparticle tracking analyzer, or a standard transmission electron microscopy method. The light scattering method using a nanoparticle tracking analyzer measures Brownian motion of a suspension of nanoparticles using scattered light intensity. Analysis of the scattered light from the Brownian motion allows for the determination of the diffusion coefficients, which can then be expressed as a particle size. The transmission electron microscopy (TEM) method uses an electron beam to develop an image of electron density for a sample of nanoparticles dried on a conductive grid. Particle sizes are determined using the known magnification factor of the recorded image.

In the following examples, this list of compounds are used:

| Component | CAS Number | Function |
| --- | --- | --- |
| CR39 ® | 142-22-3 | Allyl monomer |
| Benzoyl peroxide | 94-36-0 | Organic peroxide |
| Hydrogen peroxide | 7722-84-1 | Aqueous peroxide |
| Iron(II) chloride tetrahydrate | 13478-10-9 | Peroxide catalyst |
| Water | 7732-18 | Solvent |
| Tetrahydrofuran | 109-99-9 | Solvent |
| Diethyl Ether | 60-29-7 | Solvent |
| Hexane | 110-54-3 | Solvent |
| Methanol | 67-56-1 | Solvent |
| Ethanol | 64-17-5 | Solvent |
| Acetone | 67-64-1 | Solvent |
| Acetonitrile | 75-05-8 | Solvent |
| Alpha-tocopherol | 10191-41-0 | Free radical scavenger |
| Butylated hydroxytoluene (BHT) | 128-37-0 | Free radical scavenger |
| L-Ascorbic Acid | 50-81-7 | Free radical scavenger |

-continued

| Component | CAS Number | Function |
|---|---|---|
| Erythrosine B | 16423-68-0 | Dye |
| Zinc (II) 5,10,15,20-(tetraphenyl)porphyrin | 14074-80-7 | Dye |
| Sudan blue (II) | 17354-14-2 | Dye |
| Remazol Brilliant Blue R | 2580-78-1 | Dye |
| Reactive Yellow 15 | 12226-47-0 | Dye |
| Poly(ethylene glycol) | 25322-68-3 | Cryoprotectant |
| Poly(butadiene) | 9003-17-2 | Part of di-block-co-polymer |
| Poly(ethylene glycol) | 25322-68-3 | Part of di-block-co-polymer |
| Poly(acrylic acid) | 9003-01-4 | Part of di-block-co-polymer |
| Poly(styrene) | 9003-53-6 | Part of di-block-co-polymer |
| Poly(vinyl alcohol) | 9002-89-5 | Part of di-block-co-polymer |
| Poly(propylene glycol) | 25322-69-4 | Part of di-block-co-polymer |
| Poly(methyl methacrylate) | 9011-14-7 | Part of di-block-co-polymer |
| Tetraethyl orthosilicate | 78-10-4 | Crosslinker |
| Hydrochloric acid | 7647-01-0 | Crosslinker reagent |
| 1-(3-Dimethylaminopropyl)-3-ethylcarbodiimide Hydrochloride | 1892-57-5 | Crosslinker reagent |
| Trimethylolpropane tris(3-mercaptopropionate) | 33007-83-9 | Crosslinker |
| 2,2-(ethylene dioxene) bis(ethyl amine)) | 929-59-9 | Crosslinker |
| 1,4-Butanediol Bis(3-aminopropyl) Ether) | 7300-34-7 | Crosslinker |
| Azobisisobutyronitrile | 78-97-1 | Radical initiator |

25

In the following examples, this list of samples were used:

| Code | Sample System |
|---|---|
| Z000 | Zinc (II) 5,10,15,20-(tetraphenyl)porphyrin |
| CS58 | Dye encapsulated nanoparticles {zinc (II) 5,10,15,20-(tetra phenyl) porphyrin (dye) poly(1,2-butadiene)$_{5000}$-b-poly (ethylene glycol)$_{4000}$-methacrylate terminated (di-block-co-polymer)} shell crosslinked using tetraethyl orthosilicate (5 times the weight to the poly (ethylene glycol) block) with 1% azobisisobutyronitrile and 0.5% N,N-dimethylacrylamide. Nanoparticles resuspended in deionized water. |
| CS41 | Dye encapsulated nanoparticles {zinc (II) 5,10,15,20-(tetra phenyl) porphyrin (dye) poly(1,4-butadiene)$_{9000}$-b-poly (acrylic acid)$_{3500}$ (di-block-co-polymer)} shell crosslinked using tetraethyl orthosilicate (5 times the weight to the poly (acrylic acid)block)in the presence of 0.001M hydrochloric acid, core crosslinked via free radicalization in the presence of trimethylolpropane tris(3-mercaptopropionate), initiated using azobisisobutyronitrile at 80 degrees Celsius for 24 hours. |
| Z009 | (1,2)Poly(butadiene)$_{15,000}$-b-Poly(acrylic acid)$_{6,500}$ (5 times the weight to the dye) with Zinc (II) 5,10,15,20-tetraphenyl porphyrin. |
| CS172 | (1,2)Poly(butadiene)$_{15,000}$-b-Poly(acrylic acid)$_{6,500}$ (5 times the weight to the dye) with Zinc (II) 5,10,15,20-tetraphenyl porphyrin and α-tocopherol (80 times the weight to the dye). |
| CS173 | (1,2)Poly(butadiene)$_{15,000}$-b-Poly(acrylic acid)$_{6,500}$ (5 times the weight to the dye) with Zinc (II) 5,10,15,20-tetraphenyl porphyrin and α-tocopherol (160 times the weight to the dye). |
| CS175 | (1,2)Poly(butadiene)$_{15,000}$-b-Poly(acrylic acid)$_{6,500}$ (10 times the weight to the dye) with Zinc (II) 5,10,15,20-tetraphenyl porphyrin and α-tocopherol (80 times the weight to the dye). |
| Z010 | (1,2)Poly(butadiene)$_{15,000}$-b-Poly(acrylic acid)$_{6,500}$ (5 times the weight to the dye) with Sudan Blue (II). |
| CS179 | (1,2)Poly(butadiene)$_{15,000}$-b-Poly(acrylic acid)$_{6,500}$ (5 times the weight to the dye) with Sudan Blue (II) and α-tocopherol (80 times the weight to the dye). |
| CS180 | (1,2)Poly(butadiene)$_{15,000}$-b-Poly(acrylic acid)$_{6,500}$ (5 times the weight to the dye) with Sudan Blue (II) and α-tocopherol (160 times the weight to the dye). |
| CS181 | (1,2)Poly(butadiene)$_{15,000}$-b-Poly(acrylic acid)$_{6,500}$ (10 times the weight to the dye) with Sudan Blue (II) and α-tocopherol (805 times the weight to the dye). |
| CSL148 | Poly(methyl methacrylate)$_{7,400}$-b-Poly(acrylic acid)$_{24,300}$ at 1.21 mg/mL with reactive yellow 15 at 0.242 mg/mL in methanol. |
| CSL149 | Pluronic F127 (Poly(ethylene oxide)$_{4,500}$-b-Poly(propylene oxide)$_{3,300}$-b-Poly(ethylene oxide)$_{4,500}$) at 1.21 mg/mL with reactive yellow 15 at 0.242 mg/mL in water. |
| CSL150 | Poly(vinyl alcohol)$_{2,300}$-b-Poly(styrene)$_{12,500}$ at 1.21 mg/mL with reactive yellow 15 at 0.242 mg/mL in acetone |

-continued

| Code | Sample System |
|---|---|
| CSL151 | Poly(methyl methacrylate)$_{7,400}$-b-Poly(acrylic acid)$_{24,300}$ at 1.21 mg/mL with reactive yellow 15 at 0.242 mg/mL in ethanol. |
| CSL152 | Pluronic F127 (Poly(ethylene oxide)$_{4,500}$-b-Poly(propylene oxide)$_{3,300}$-b-Poly(ethylene oxide)$_{4,500}$) at 1.21 mg/mL with reactive yellow 15 at 0.242 mg/mL in methanol. |
| CSL153 | Poly(ethylene oxide)$_{18,000}$-b-Poly(styrene)$_{9,500}$ at 1.21 mg/mL with reactive yellow 15 at 0.242 mg/mL in acetonitrile. |
| CSL011 | 0.5 mg/mL Remazol Brilliant Blue R, 2.5 mg/mL Polystyrene$_{9500}$-b-polyethylene oxide$_{5000}$, in 1 mL of methanol. |
| CSL012 | 0.5 mg/mL Remazol Brilliant Blue R, 2.5 mg/mL Polystyrene$_{9500}$-b-polyethylene oxide$_{5000}$, 0.2 mg/mL ascorbic acid, in 1 mL of methanol. Directly injected in 9 mL of THF. |
| CSL013 | 0.5 mg/mL Remazol Brilliant Blue R, 2.5 mg/mL Polystyrene$_{9500}$-b-polyethylene oxide$_{5000}$, 2 mg/mL ascorbic acid, in 1 mL of methanol. Directly injected in 9 mL of THF. |
| CSL014 | 0.5 mg/mL Remazol Brilliant Blue R, 2.5 mg/mL Polystyrene$_{9500}$-b-polyethylene oxide$_{5000}$, 20 mg/mL ascorbic acid, in 1 mL of methanol. Directly injected in 9 mL of THF. |
| CSL015 | 0.5 mg/mL Remazol Brilliant Blue R, 2.5 mg/mL Polystyrene$_{9500}$-b-polyethylene oxide$_{5000}$, 100 mg/mL ascorbic acid, in 1 mL of methanol. Directly injected in 9 mL of THF. |
| CSL016 | 0.5 mg/mL Remazol Brilliant Blue R, 2.5 mg/mL Polystyrene$_{9500}$-b-polyethylene oxide$_{5000}$, in 1 mL of methanol. Directly injected in 9 mL of THF. 200 mg/mL ascorbic acid added after micellization. |
| CSL127 | 0.5 mg/mL zinc tetraphenylporphyrin, 2.5 mg/mL poly(1,2-butadiene$_{15000}$)-b-poly(acrylic acid$_{6500}$), in 10 mL of THF, microfluidic mixed with water. |
| CSL128 | 0.5 mg/mL zinc tetraphenylporphyrin, 2.5 mg/mL poly(1,2-butadiene$_{15000}$)-b-poly(acrylic acid$_{6500}$), in 10 mL of THF, microfluidic mixed with water. Crosslinked using EDC and 2,2-(ethylene dioxene) bis(ethyl amine)) at 0.1 equivalents of diamine and EDC to acrylic acid in 0.1M HEPES buffer (pH 5). |
| CSL129 | 0.5 mg/mL zinc tetraphenylporphyrin, 2.5 mg/mL poly(styrene$_{64000}$)-b-poly(acrylic acid$_{9500}$), in 10 mL of THF, microfluidic mixed with water. |
| CSL130 | 0.5 mg/mL zinc tetraphenylporphyrin, 2.5 mg/mL poly(styrene$_{64000}$)-b-poly(acrylic acid$_{9500}$), in 10 mL of THF. Microfluidic mixed with water. Crosslinked using EDC and Diamine at 0.1 equivalents of 2,2-(ethylene dioxene) bis(ethyl amine)) and EDC to acrylic acid in 0.1M HEPES buffer (pH 5) |
| 003A | Poly(styrene)$_{65,000}$-b-Poly(acrylic acid)$_{80,000}$ at 5 mg/mL with zinc (II) tetraphenylporphyrin at 0.5 mg/mL in THF. Microfluidic mixed with water. |
| 003C | Poly(styrene)$_{65,000}$-b-Poly(acrylic acid)$_{80,000}$ at 5 mg/mL with zinc (II) tetraphenylporphyrin at 0.5 mg/mL in THF. Microfluidic mixed with water. HEPES buffer (500 uL, 1.5M, pH ~6.5) was added. |
| 003D | Poly(styrene)$_{65,000}$-b-Poly(acrylic acid)$_{80,000}$ at 5 mg/mL with zinc (II) tetraphenylporphyrin at 0.5 mg/mL in THF. Microfluidic mixed with water. EDC (1 equiv) and 2,2'-(ethylenedioxy) bis(ethylamine) (0.5 equiv) were added. |
| 003E | Poly(styrene)$_{65,000}$-b-Poly(acrylic acid)$_{80,000}$ at 5 mg/mL with zinc (II) tetraphenylporphyrin at 0.5 mg/mL in THF. Microfluidic mixed with water. HEPES buffer (500 uL, 1.5M, pH ~6.5) was added, EDC (1 equiv) and 2,2'-(ethylenedioxy) bis(ethylamine) (0.5 equiv) were added. |
| 005A2 | Poly(methyl methacrylate)$_{27,000}$-b-Poly(acrylic acid)$_{16,500}$ at 5 mg/mL with zinc (II) tetraphenylporphyrin at 0.5 mg/mL in THF. Microfluidic mixed with water. |
| 005F | Poly(methyl methacrylate)$_{27,000}$-b-Poly(acrylic acid)$_{16,500}$ at 5 mg/mL with zinc (II) tetraphenylporphyrin at 0.5 mg/mL in THF. Microfluidic mixed with water. EDC (1 equiv) and 2,2'-(ethylenedioxy) bis(ethylamine) (0.5 equiv) were added. |

The dye zinc (II) 5,10,15,20-(tetraphenyl)porphyrin was purchased from Porphychem. Sudan blue II, benzoyl peroxide, hydrogen peroxide, alpha-tocopherol, butylated hydroxytoluene, tetraethyl orthosilicate, hydrochloric acid, Remazol Brilliant Blue R, Poly(ethylene glycol)$_{4000}$, L-Ascorbic acid, Reactive Yellow 15, 2,2-(ethylene dioxene) bis(ethyl amine)), trimethylolpropane tris(3-mercapto-propionate), and azobisisobutyronitrile were purchased from Sigma Aldrich. Iron(II) chloride tetrahydrate was purchased from ACP chemicals. All of the block copolymers were purchased from Polymer Source Inc or Millipore Sigma. The tetrahydrofuran, 2-[4-(2-Hydroxyethyl)piperazin-1-yl]ethane-1-sulfonic acid, 1,4-Butanediol Bis(3-aminopropyl) Ether), and 1-(3-Dimethylaminopropyl)-3-ethylcarbodiimide Hydrochloride used were purchased from Fisher Scientific. CR39™ and Hi-Gard™ were provided by industrial partners. Acetone, acetonitrile, methanol, ethanol, diethyl ether, and hexane were purchased from Dalhousie University chemistry department.

Spectrophotometer quartz cuvettes (VWR spectrophotometer cell, fluoro flat) were purchased from VWR, catalog #414004-064. Micropipettes used were Fisherbrand, Finnpipette™ II, adjustable-column pipettes, 100-1000 µL, Mandel PSR #14440. UV-VIS spectra were taken on an Agilent 8453 Cary™ 60 and the Genesys 50 Spectrophotometer. UV photobleaching experiments were conducted using a UV reactor Rayonet Photochemical Chamber Reactor, model RPR-100, with ten 253.7 nm lamps and four 350 nm lamps, with an intensity reading of 12,800 microwatts/cm². Nanoparticle tracking experiments were conducted with Particle Metrix Zetaview® Nanoparticle Tracking analyzer PMX120. TEM experiments were conducted on a Jeol JEM 1230 with negative staining using Uranyl Acetate. Nanoparticle fabrication by microfluidic mixing was conducted using a Mitos Dolomite microfluidic system. Heating was done using a Thermo Scientific PR305225G Compact Gravity Oven; 1.7 cu ft, 120 V.

Microfluidic Mixing Method of Preparing Composite Particle Solution

The following general method is used to encapsulate dye by amphiphilic block copolymer and to prepare the composite particles of the present disclosure.

Composite particle preparation is done using microfluidic mixing. The amphiphilic block copolymer, dye, free-radical scavenger, and other materials if present that comprise the composite particle were dissolved into a solvent such as THF or methanol. The resulting solution was then mixed with an antisolvent such as water or toluene in a laminar flow fashion with tight control over the flow rate ratios. This mixing of solvent and antisolvent causes the self-assembly of the amphiphilic block copolymer resulting into the composite particle where the amphiphilic block copolymer encapsulating the dye, the free-radical scavenger, and any other materials used.

General Method for Drying Composite Particle

Once the composite particles are prepared as mentioned above as a solution, polyethylene glycol$_{4000}$ was then added at 10 mg/g to the solution of composite particle and mixed until dissolved. Alternatively, polyethylene glycol$_{20000}$, polyethylene glycol$_{400}$, 2-[4-(2,4,4-trimethylpentan-2-yl) phenoxy]ethanol, or no additional surfactant was used. The resulting mixture was then filtered through a Millipore™ filter to remove the solvent and leave a dry solid powder of composite particles on a filter paper. Some mixtures were dried by ambient conditions with positive air flow.

Example 2: Peroxide Stability in Aqueous Solutions

Procedures

A solution of zinc (II) 5,10,15,20-(tetraphenyl)porphyrin dye (hydrophobic dye) was prepared using a microfluidic mixing system (Z000 and CS58) to create control dyes and encapsulated dye in normal phase micelles to be used in the experiment. One aliquot was taken to be used as a control without H$_2$O$_2$, while the other two aliquots were prepared with 3.5% H$_2$O$_2$. Each sample was measured using the UV-Vis spectrophotometer in a quartz cuvette after the instrument was blanked with deionized (D.I.) water. One sample with H$_2$O$_2$ and the sample without H$_2$O$_2$ were exposed to UV light using the UV reaction chamber for 1 and 5 minutes, then remeasured. The other solution containing the dye and H$_2$O$_2$ was measured at the same time points, but without the exposure to UV light.

Solutions in D.I. water of zinc (II) 5,10,15,20-(tetraphenyl)porphyrin dye as free dye (Z000) or encapsulated dye (CS 58) prepared as described in the General Method were prepared with 3.5% H$_2$O$_2$, and 10 µg/mL FeCl$_2$·4H$_2$O. FeCl$_2$·4H$_2$O was used as a catalyst for the free-radical formation. Each solution was prepared, measured using a UV-Vis spectrophotometer, exposed to UV light, and then re-measured after a series of exposure times.

Results

Figure 2:
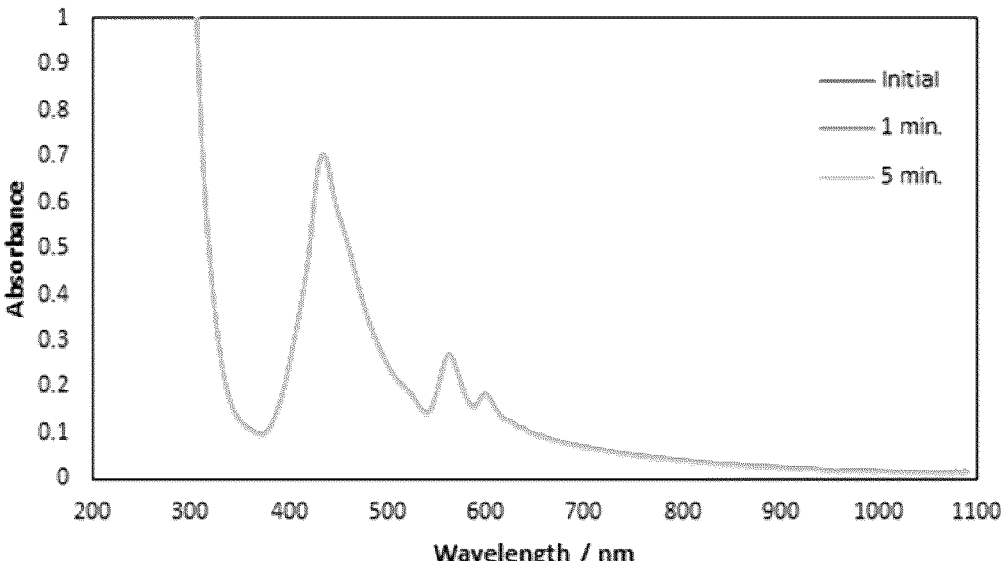
FIG. 2 shows a graph of absorbance as a function of wavelength for a composition comprising zinc (II) 5,10,15,20-(tetraphenyl)porphyrin free dye in solution exposed to 3.5% $H_2O_2$ for 5 minutes.
Figure 3:
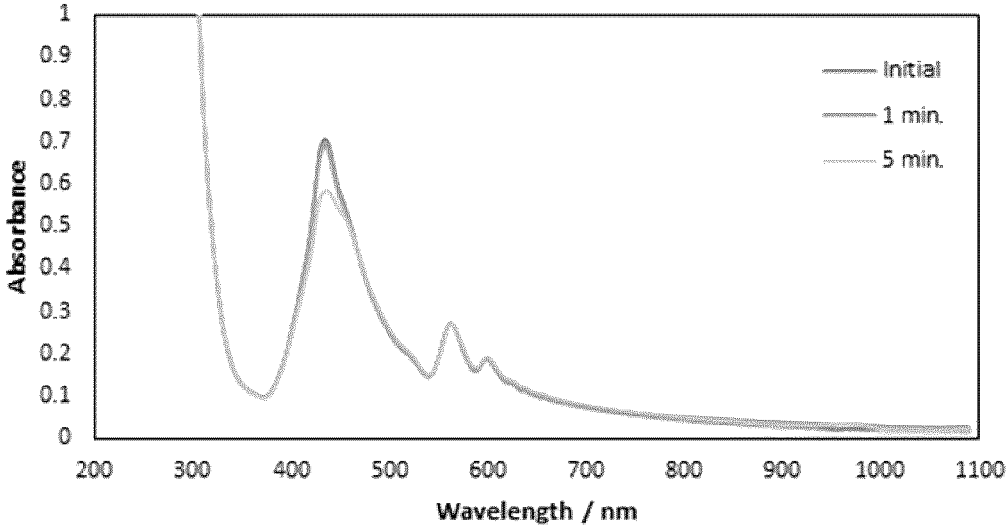
FIG. 3 shows a graph of absorbance as a function of wavelength for a composition comprising zinc (II) 5,10,15,20-(tetraphenyl)porphyrin free dye in solution exposed to UV light and 3.5% $H_2O_2$ for 5 minutes.
Figure 4:
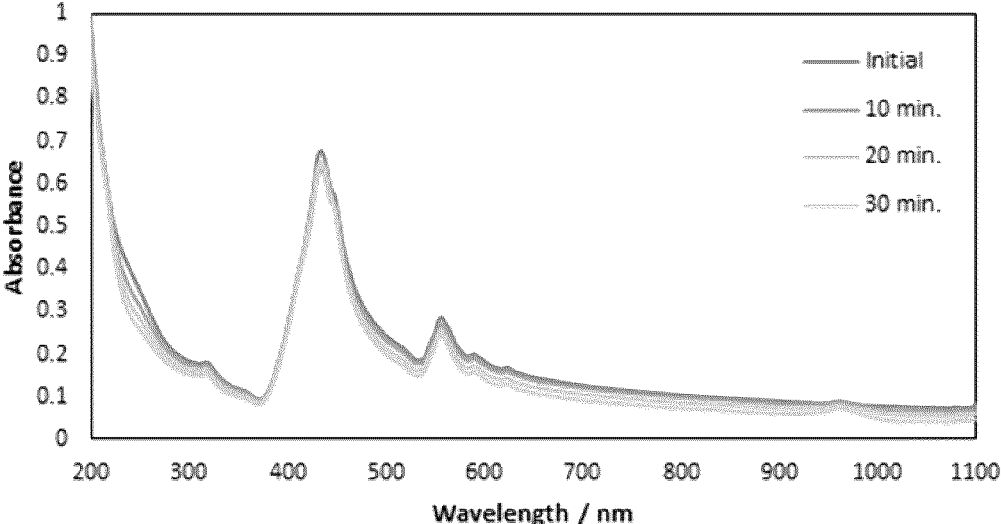
FIG. 4 shows a graph of absorbance as a function of wavelength for a composition comprising zinc (II) 5,10,15,20-(tetraphenyl)porphyrin encapsulated dye (CS58) exposed to UV light for 30 minutes.
Figure 5:
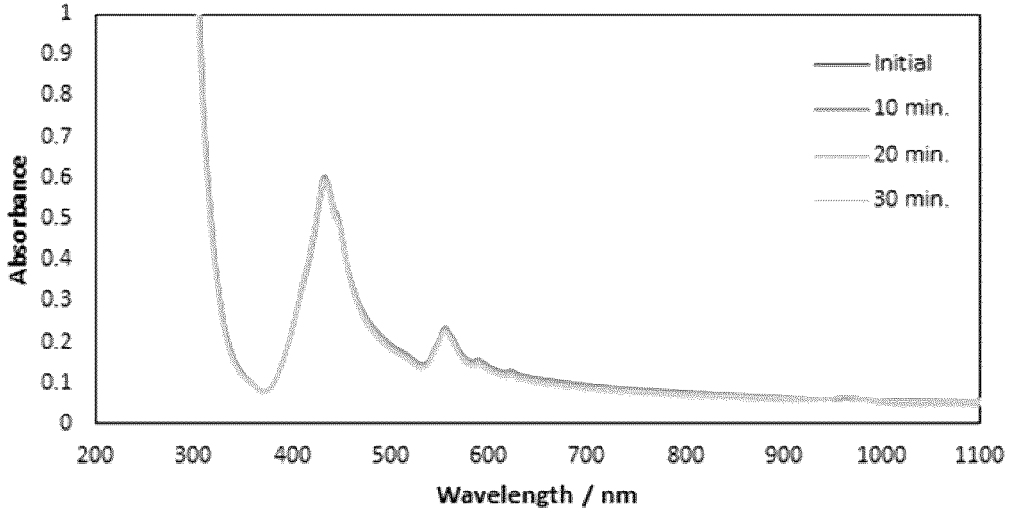
FIG. 5 shows a graph of absorbance as a function of wavelength for a composition comprising zinc (II) 5,10,15,20-(tetraphenyl)porphyrin encapsulated dye (CS58) exposed to UV light and 3.5% $H_2O_2$ for 30 minutes.

Control experiments were performed to determine how much dye degrades in the presence of either UV light or H$_2$O$_2$ individually. The results for these experiments are displayed in FIG. 1 and FIG. 2. A test of the zinc (II) 5,10,15,20-(tetraphenyl)porphyrin free dye exposed to both UV light and H$_2$O$_2$ is shown in FIG. 3. From these results, the degree of degradation due to either UV light or H$_2$O$_2$ individually are negligible, while the creation of reactive oxygen species (ROS) from the reaction of H$_2$O$_2$ with the UV light leads to more significant degradation of the hydrophobic dye. Similar experiments were performed on normal phase polymer micelle encapsulated hydrophobic dyes (CS58). A representative trial for encapsulated hydrophobic dye exposed to UV light is shown in FIG. 4, and a representative trial for encapsulated hydrophobic dye exposed to H$_2$O$_2$ and UV light is shown in FIG. 5.

Figure 6:
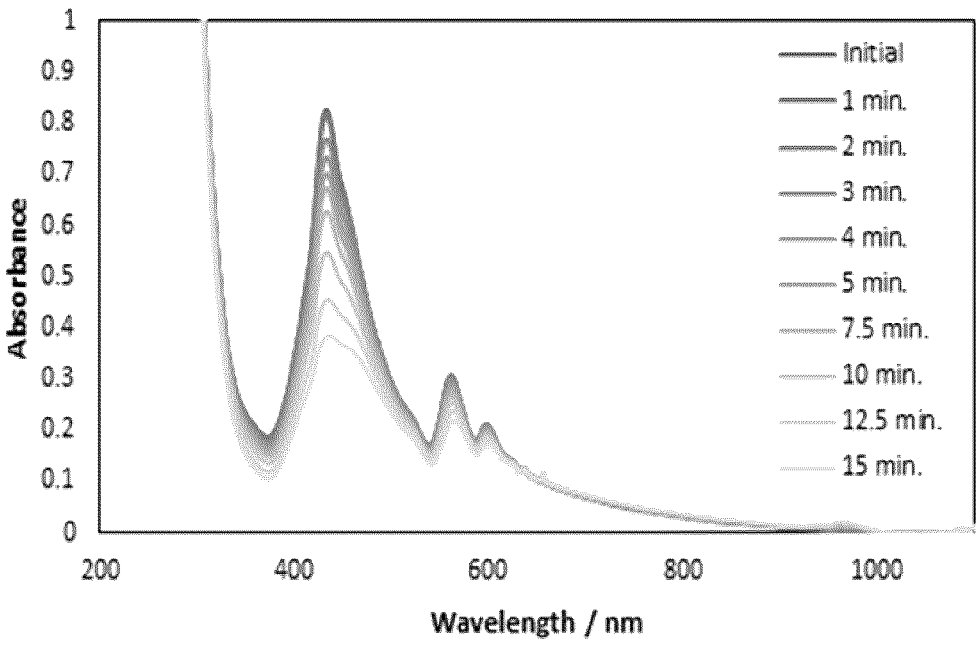
FIG. 6 shows a graph of absorbance as a function of wavelength for Zinc (II) 5,10,15,20-(tetraphenyl)porphyrin free dye undergoing photo-Fenton degradation.
Figure 7:
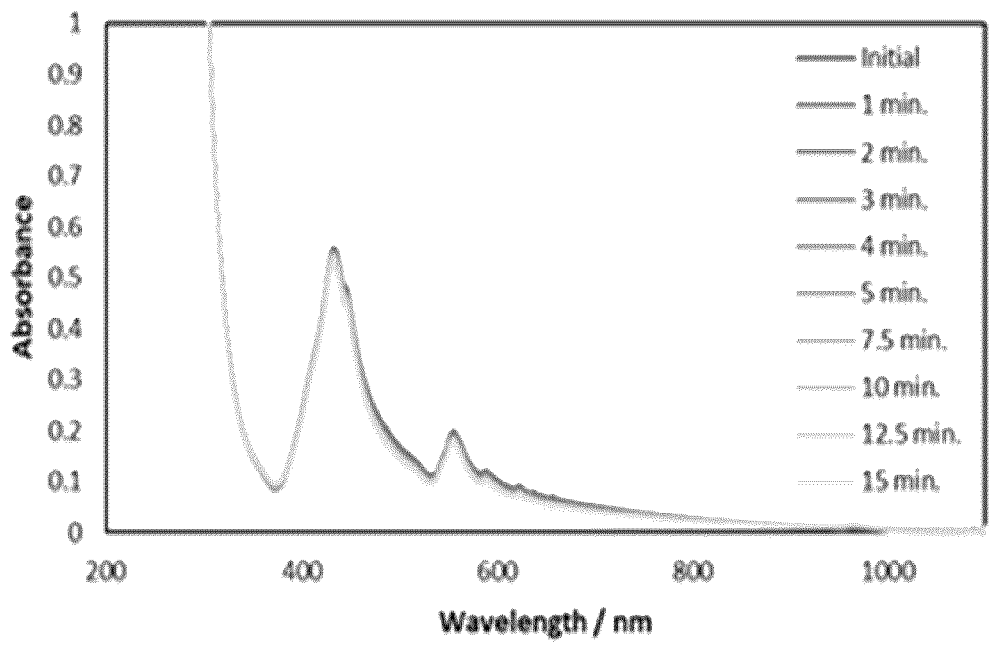
FIG. 7 shows a graph of absorbance as a function of wavelength for Zinc (II) 5,10,15,20-(tetraphenyl)porphyrin CS58 encapsulated dye undergoing photo-Fenton degradation.

Degradation of zinc (II) 5,10,15,20-(tetraphenyl)porphyrin in aqueous solution was performed with 10 µg/mL FeCl$_2$·4H$_2$O, and 3.5% H$_2$O$_2$ in D.I. water using the photo-Fenton reaction. The solution was measured using the UV-Vis spectrophotometer, exposed to UV light, and then re-measured after different time periods. The measurement of the zinc (II) 5,10,15,20-(tetraphenyl)porphyrin free dye is shown below in FIG. 6. A similar experiment was performed using CS58 normal phase micelle encapsulated zinc (II) 5,10,15,20-(tetraphenyl)porphyrin dye that was resuspended in D.I. water with 10 µg/mL FeCl$_2$·4H$_2$O, and 3.5% H$_2$O$_2$ and is displayed in FIG. 7.

Conclusions

Figure 8:
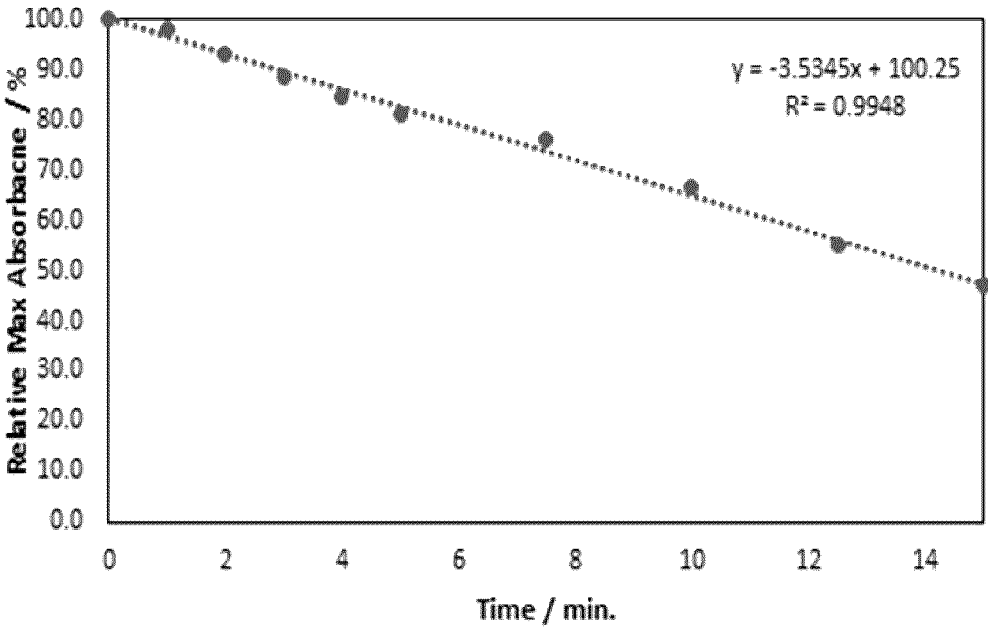
FIG. 8 shows a graph of relative max absorbance as a function of time of Zinc (II) 5,10,15,20-(tetraphenyl)porphyrin free dye undergoing photo-Fenton degradation over time.
Figures 9, 10:
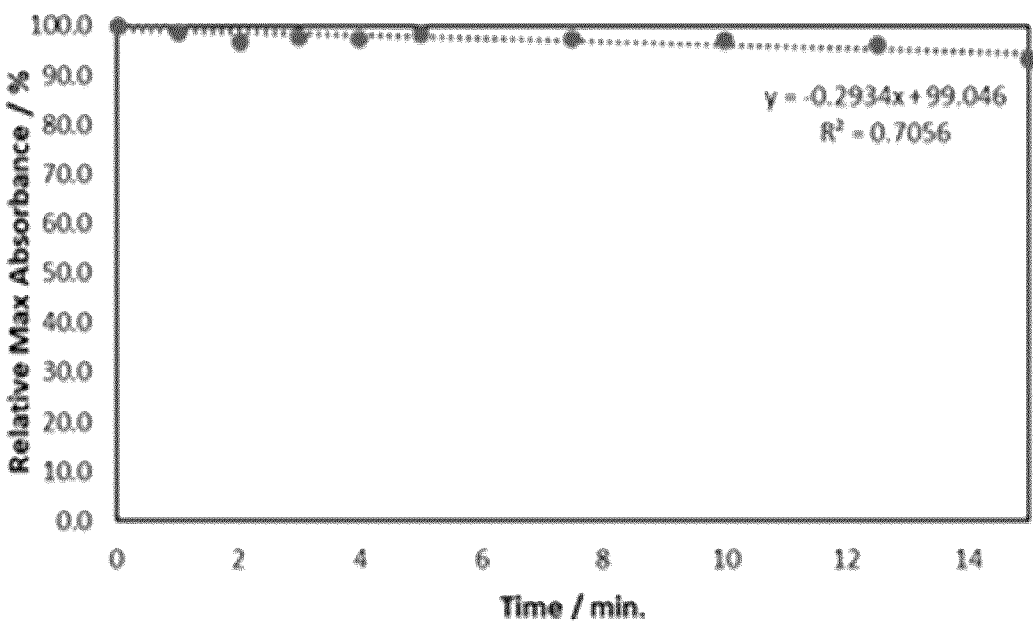
FIG. 9 shows a graph of relative max absorbance as a function of time of Zinc (II) 5,10,15,20-(tetraphenyl)porphyrin encapsulated (CS58) dye undergoing photo-Fenton degradation over time.
FIG. 10 shows a graph of absorbance as a function of wavelength of Zinc (II) 5,10,15,20-(tetraphenyl)porphyrin degradation due to 0.3% w/w BPO.

This example described here compares the rate of photo-degradations between unencapsulated free ZnTPP and ZnTPP encapsulated in a normal phase micelle. Free ZnTPP was observed to degrade significantly under the presented conditions, as seen in FIG. 8 whereas the encapsulated ZnTPP was observed to degrade negligibly, as seen in FIG. 9.

This example demonstrates a reduction in rate of photo-degradation of over twelve times due to encapsulation, under the presented conditions.

Example 3: Peroxide Stability in CR39 Monomer

Procedures

To determine if dye content can be protected from free radical damage in the CR39 monomer by using free radical scavengers, samples of Z009 were prepared in CR39 monomer with free radical scavengers added directly into the monomer. The free radical scavengers tested were butylated hydroxytoluene (BHT) and α-tocopherol. A solution of 10 mg of zinc (II) 5,10,15,20-(tetraphenyl)porphyrin was added to 15 mL of CR39. To a 4 mL solution of dye in CR39, 0.3% benzoyl peroxide (BPO) w/w was added, and UV-Vis measurements were taken of the solution over time to determine any change in absorbance. Once the degradation profile was recorded, free radical scavengers were added to a fresh stock solution of zinc (II) 5,10,15,20-(tetraphenyl)porphyrin in CR39 to see if the degradation profile would change. These free radical scavengers were added at 2.5% w/w, and then 0.3% BPO w/w was added and once again the absorbance measurements were taken of the solutions over time to determine any change in absorbance.

Results

Figure 11:
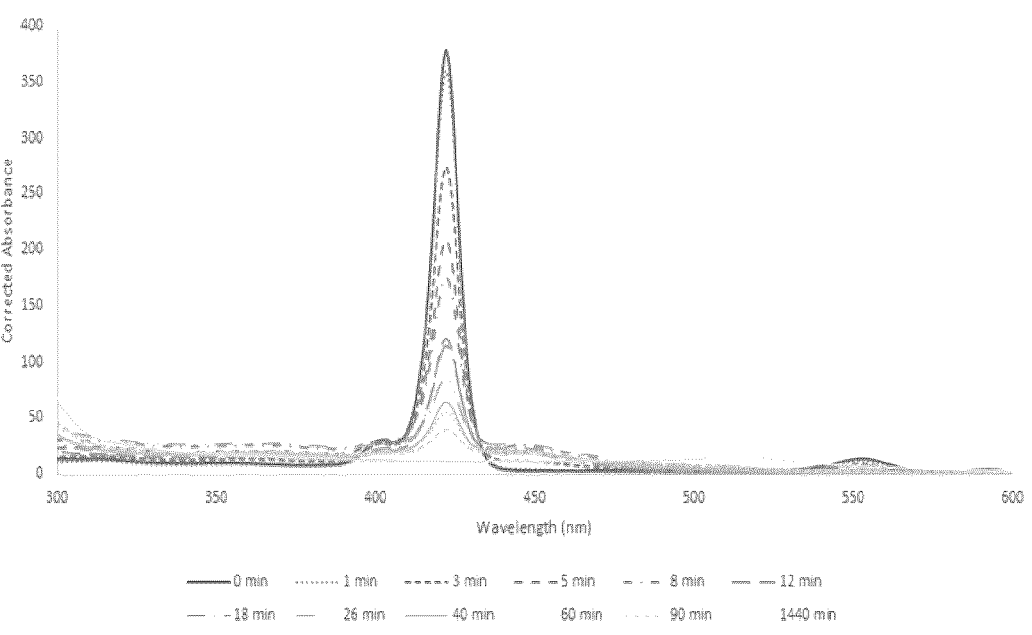
FIG. 11 shows a graph of absorbance as a function of wavelength of the degradation of Zinc (II) 5,10,15,20-(tetraphenyl)porphyrin with BHT due to 0.3% w/w BPO.
Figure 12:
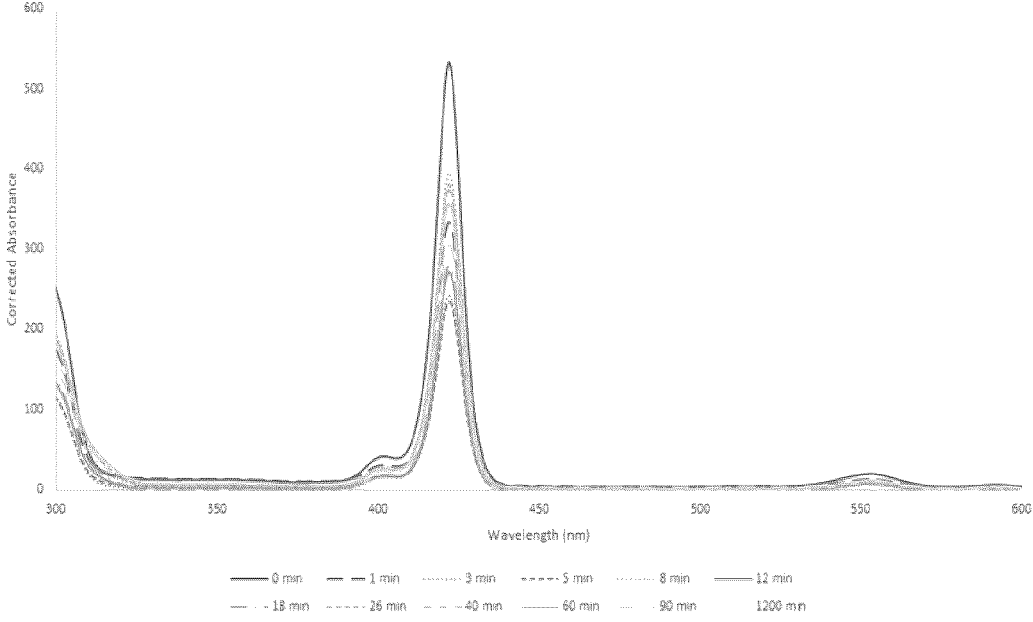
FIG. 12 shows a graph of absorbance as a function of wavelength of the degradation of Zinc (II) 5,10,15,20-(tetraphenyl)porphyrin with α-tocopherol due to 0.3% w/w BPO.

Spectra obtained from zinc (II) 5,10,15,20-(tetraphenyl) porphyrin in CR39 with 0.3% w/w BPO show dye content degraded very quickly (FIG. 10) without the use of a free radical scavenger. After 18 minutes, less than 10% of the original absorbance remained. After 24 hours, UV/Vis analysis indicates complete destruction of the dye. The addition of BHT slowed the degradation of the dye under the same exposure conditions, shown in FIG. 11. The addition of α-tocopherol significantly slowed the degradation of the dye under the same exposure conditions, shown in FIG. 12. After an initial drop in absorbance within the first few minutes of the light exposure, the absorbance in the solution stabilized to remain at approximately 66% of the original absorbance after 24 hours.

Conclusions

Figure 13:
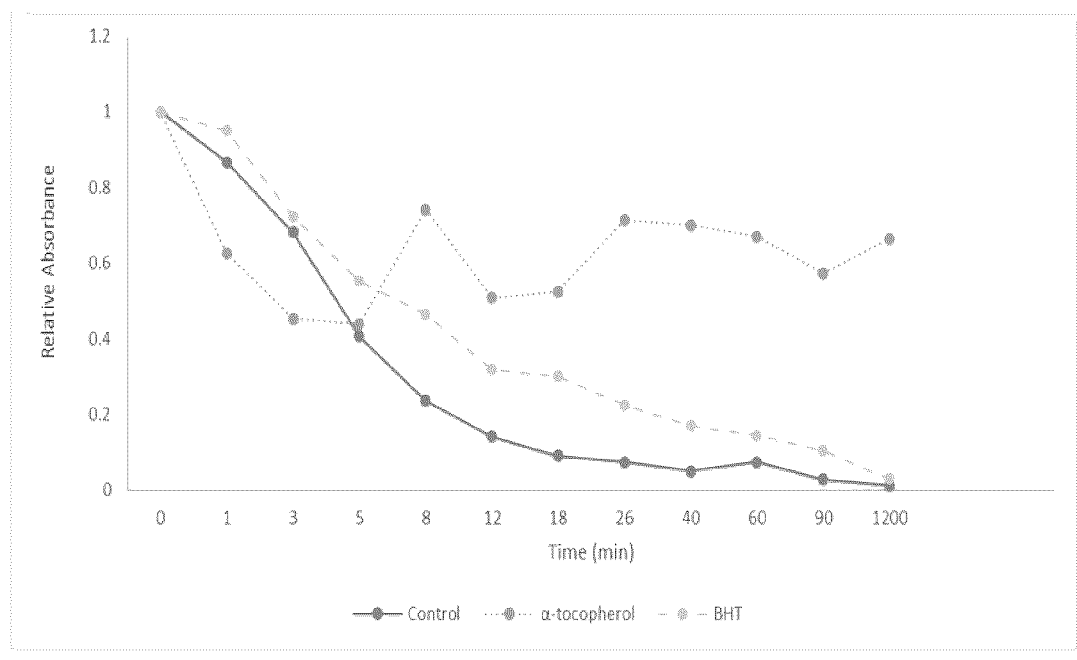
FIG. 13 shows a graph of relative absorbance as a function of time of the degradation of Zinc (II) 5,10,15,20-(tetraphenyl)porphyrin with free radical scavengers due to 0.3% w/w BPO.

Kinetic measurements of zinc (II) 5,10,15,20-(tetraphenyl)porphyrin alone or with BHT or α-tocopherol show the change in absorbance of zinc (II) 5,10,15,20-(tetraphenyl) porphyrin (FIG. 13). When no free radical scavenger was added, after 18 minutes of BPO exposure less than 10% of the original absorbance remained. When BHT was added, it took 90 minutes, for the dye to degrade to approximately 10% of the original absorbance. When α-tocopherol was added, an initial drop in absorbance within the first few minutes was observed, but the absorbance of the Zinc (II) 5,10,15,20-(tetraphenyl)porphyrin stabilized quickly at approximately 66% of the original peak.

This example demonstrates that free-radical scavengers are effective at protecting dyes from free radical degradation.

Example 4: Encapsulation of Free Radical Scavengers and Zinc (II) 5,10,15,20-Tetraphenyl Porphyrin Procedures This example describes the co-encapsulation of free-radical scavenging agents along with a dye to increase the protection effect of the free-radical scavenger. It is shown that co-encapsulation will result in a very high local concentration of the scavenging agent to the dye and will lead to better protection. To create these composite particles, amphiphilic block copolymers are used. For this experiment, (1,2)poly(butadiene)$_{15,000}$-b-poly(acrylic acid)$_{6,500}$, (Poly (styrene)$_{1,600}$-b-Poly(ethylene oxide)$_{5,000}$, (1,4)Poly(butadiene)$_{9,000}$-b-Poly(acrylic acid)$_{3,500}$, and (1,2)Poly(butadiene)$_{31,500}$-b-Poly(methyl methacrylate)$_{21,000}$ with zinc (II) 5,10,15,20-tetraphenyl porphyrin were made with different concentrations of α-tocopherol added. Composite particles were prepared using the microfluidic method as described above. Briefly, samples were prepared by dissolving amphiphilic block copolymers and zinc (II) 5,10,15,20-(tetraphenyl)porphyrin in tetrahydrofuran along with different amounts of α-tocopherol. These solutions were then prepared into nanoparticles using the microfluidic mixing method described above. Polyethylene glycol$_{4000}$ was then added at 10 mg/g to the resulting solution and mixed until dissolved. Finally, the solution was filtered through a Millipore™ (0.45 micron) filter to remove the solvent and leave a dry solid powder of composite particles on a filter paper resulting in the control Z009, and the samples CS172, CS173, and CS175.

Samples with and without α-tocopherol were then redissolved in water to determine particle size using the nanoparticle tracking analyzer (NTA) and the absorbance spectra measured using the spectrophotometer.

Samples Z009, CS172, CS173, and CS175, were then integrated into CR39 to assess their degradations against BPO.

Control sample Z009 with no α-tocopherol and test samples CS172, CS173, and CS175 with α-tocopherol were measured on the UV-Vis to get an absorbance profile. The samples were then exposed to BPO at 0.1% and the samples measured over time while being mixed.

Results

Figure 14:
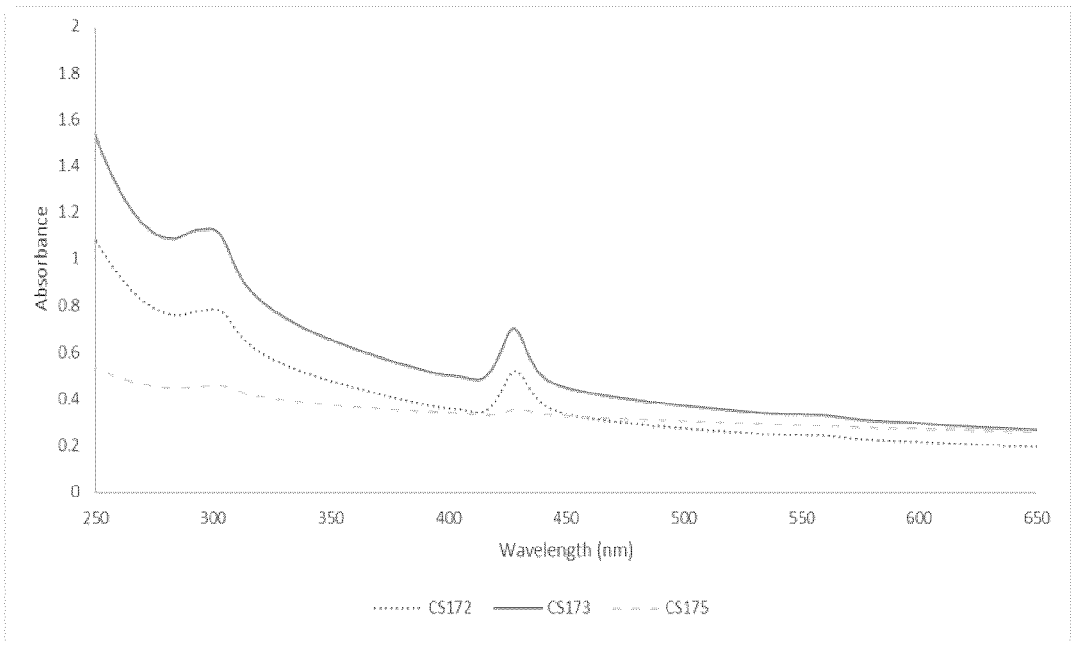
FIG. 14 shows a graph of absorbance as a function of wavelength of CS172, CS173, and CS175 in water.

Results from the UV-Vis of samples dissolved in water show that all samples have a similar dye peak (FIG. 14) corresponding to the known spectrum of zinc (II) 5,10,15, 20-tetraphenyl porphyrin. Additionally, a peak around 300 nm is visible for α-tocopherol encapsulated samples, which is indicative of α-tocopherol being present.

Figure 15:
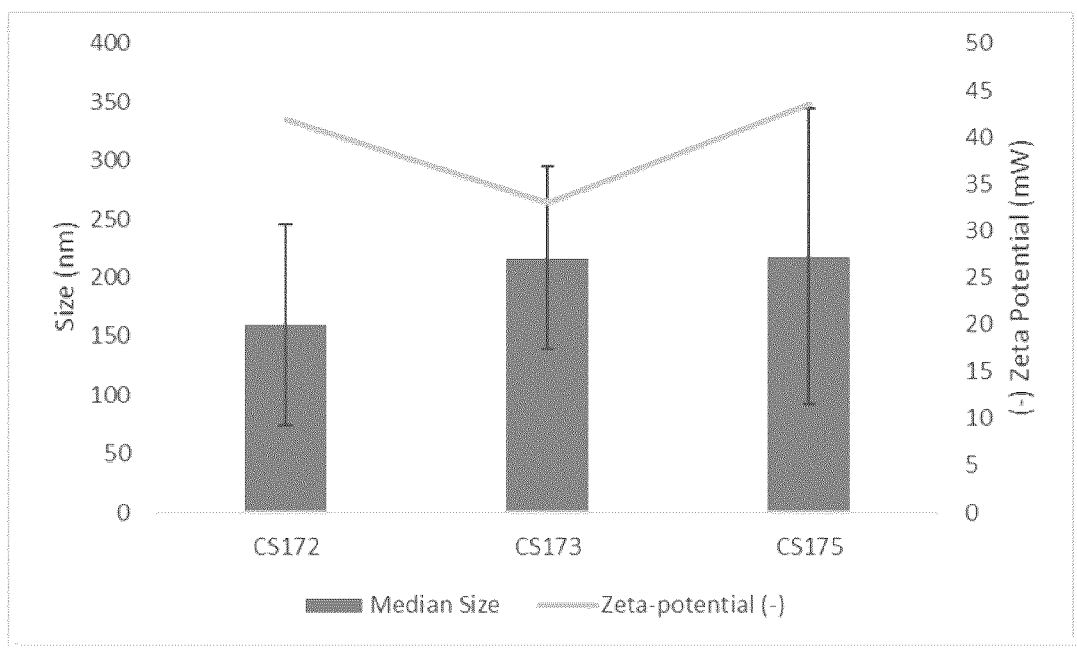
FIG. 15 shows a chart of size, size span, and zeta potential of CS172, CS173, and CS175 nanoparticles in water.
Figure 16:
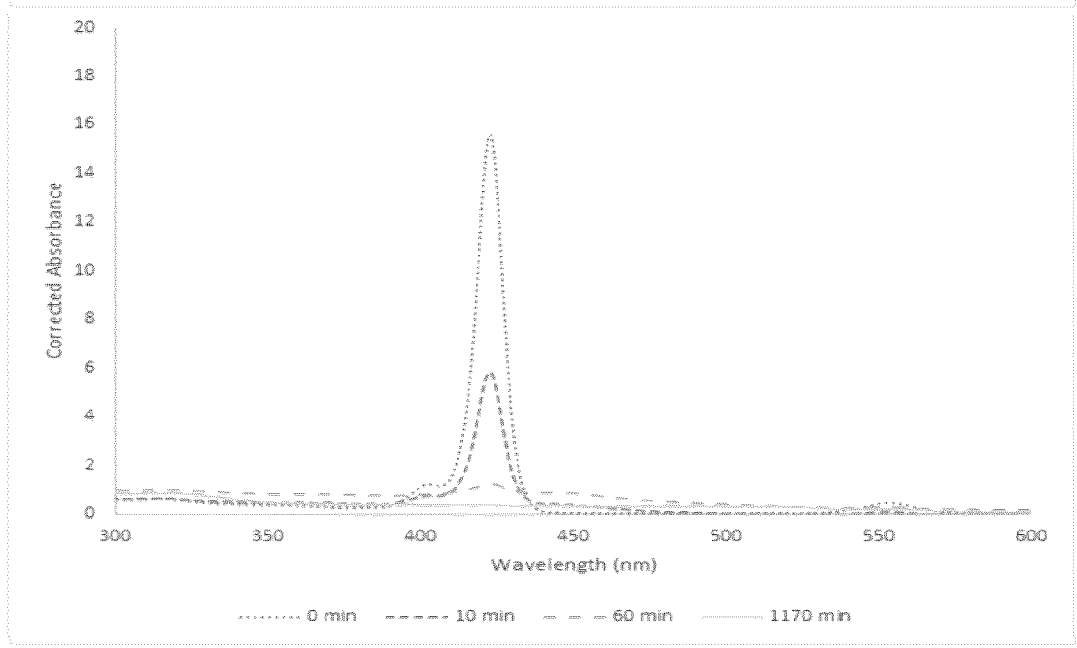
FIG. 16 shows a graph of absorbance as a function of wavelength of Zinc (II) 5,10,15,20-(tetraphenyl)porphyrin, undergoing degradation due to 0.3% w/w BPO of Z009.
Figure 17:
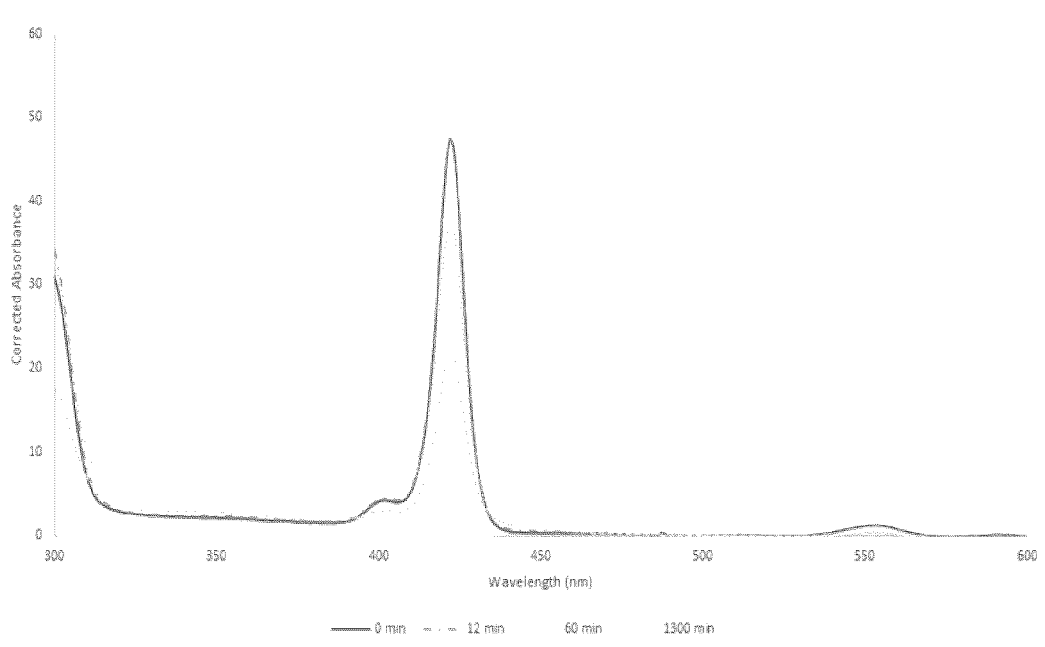
FIG. 17 shows a graph of absorbance as a function of wavelength of Zinc (II) 5,10,15,20-(tetraphenyl)porphyrin, undergoing degradation due to 0.3% w/w BPO of CS172.
Figure 18:
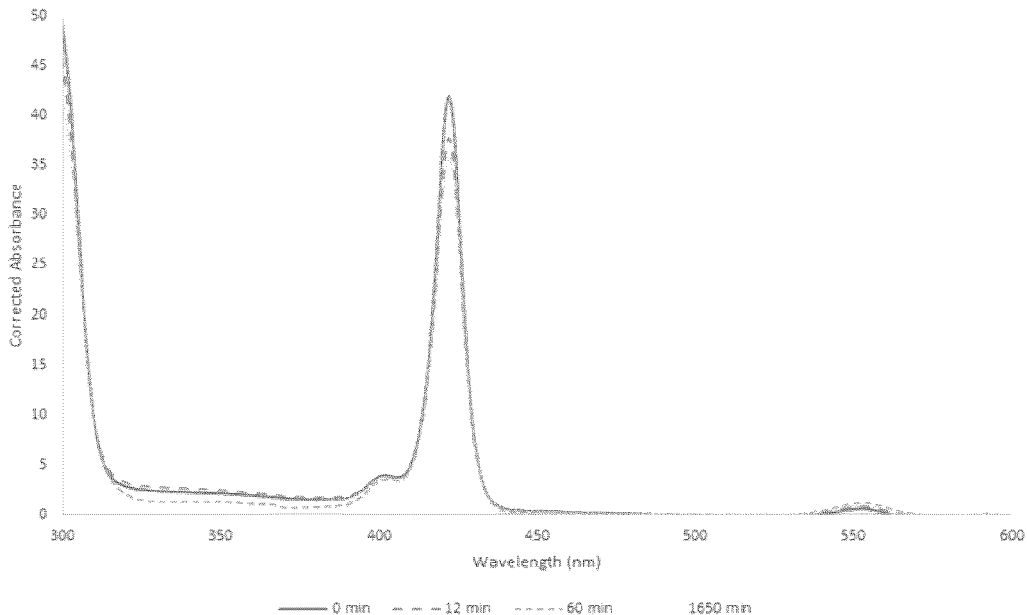
FIG. 18 shows a graph of absorbance as a function of wavelength of Zinc (II) 5,10,15,20-(tetraphenyl)porphyrin, undergoing degradation due to 0.3% w/w BPO of CS173.
Figure 19:
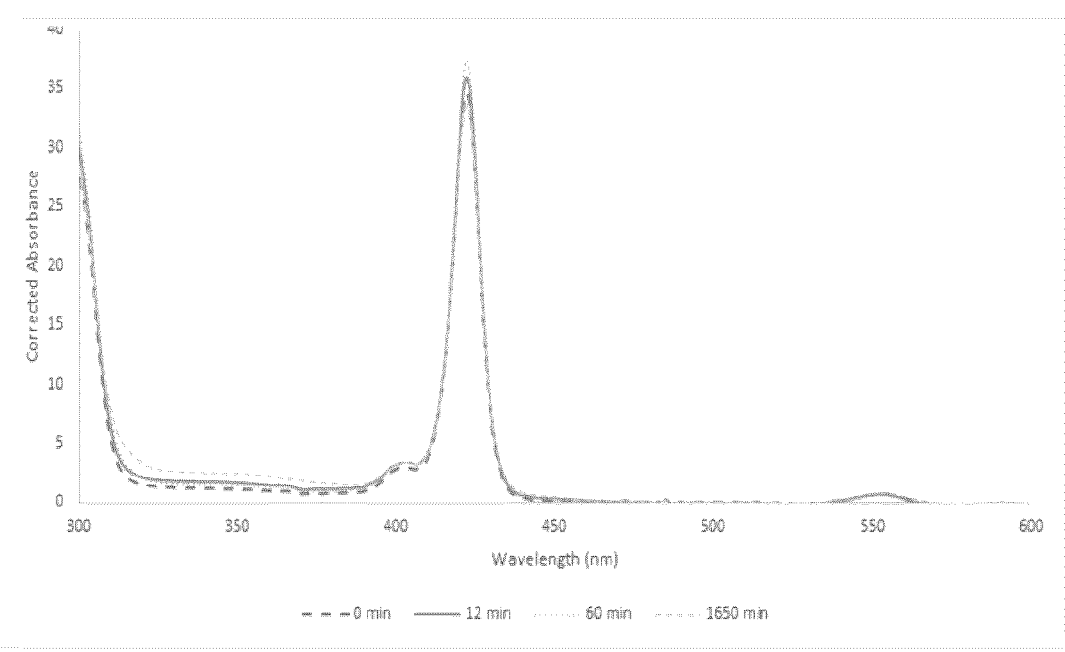
FIG. 19 shows a graph of absorbance as a function of wavelength of Zinc (II) 5,10,15,20-(tetraphenyl)porphyrin, undergoing degradation due to 0.3% w/w BPO of CS175.

Results from the NTA show that all samples contained nanoparticles when resuspended in water (FIG. 15). The average sizes of the nanoparticles range from 160 nm to 217 nm, with various spans. The zeta potential of the nanoparticles ranges from −33 mV to −44 mV.

Samples Z009, CS172, CS173, and CS175 (FIGS. 16, 17, 18, and 19 respectively) in CR39 were degraded by exposure to BPO. The degradation of zinc (II) 5,10,15,20-(tetraphenyl)porphyrin dye slowed when free radical scavengers were present, and it became apparent that the α-tocopherol slowed the rate of degradation.

Conclusions

Encapsulating free radical scavengers increases the local concentration of the free radical scavenger near the encapsulated dye, leading to more effective protection. Measuring spectra of composite particle of zinc (II) 5,10,15,20-(tetraphenyl)porphyrin dye with and without α-tocopherol on the spectrophotometer showed that a peak is present at 300 nm in composite particles prepared with α-tocopherol corresponding to the α-tocopherol, and that more α-tocopherol results in a larger peak. As α-tocopherol is insoluble in water, it can be appreciated that the α-tocopherol measured is encapsulated in the composite particle.

Figure 20:
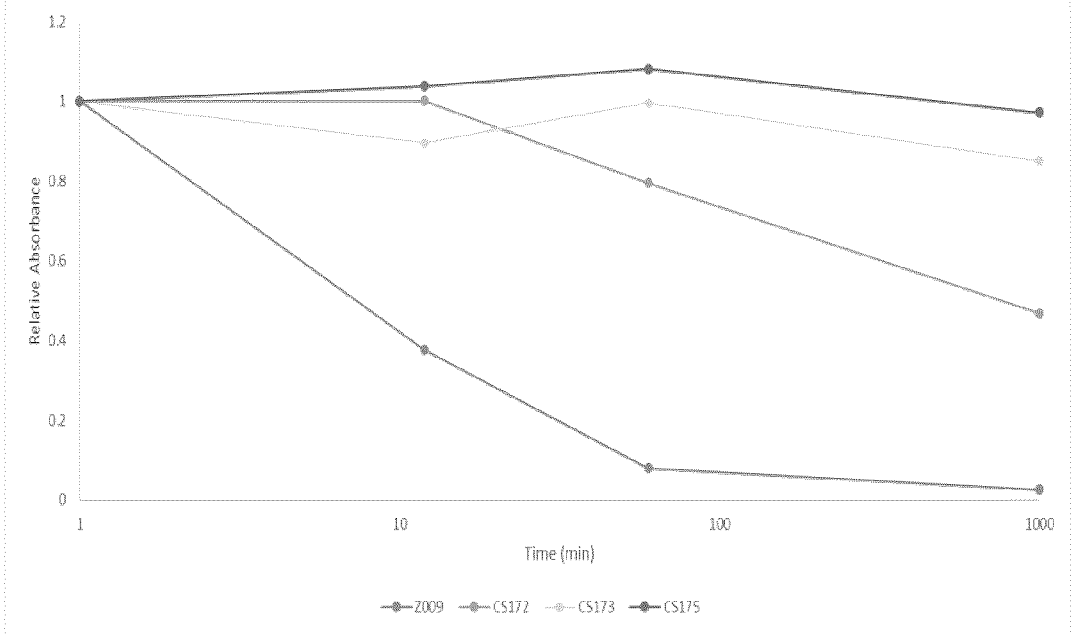
FIG. 20 shows a graph of the percent absorbance remaining as a function of time (log scale) for Z009, CS172, CS173, and CS175 after 0.3% w/w BPO exposure.

Degradation of zinc (II) 5,10,15,20-(tetraphenyl)porphyrin dye over time showed that encapsulation of α-tocopherol does indeed slow the degradation of zinc (II) 5,10,15,20-(tetraphenyl)porphyrin dye due to peroxide such as benzoyl peroxide. When using BPO the protective effect of α-tocopherol on zinc (II) 5,10,15,20-(tetraphenyl)porphyrin can be seen. Z009 demonstrated significant degradation against the presented peroxide conditions, as seen in FIG. 20. Samples CS173, and CS175 were observed to retain over 80% of their original absorbances after 1000 minutes of peroxide exposure. Sample CS172 was observed to retain over 50% of the original absorbance after 1000 minutes of peroxide exposure.

This example demonstrates the feasibility and impact of co-encapsulation of a free radical scavenging agent along with a dye against peroxide exposure conditions.

Example 5: Encapsulation of Free Radical Scavengers and Sudan Blue (II)

Procedures

The effect of coencapsulated α-tocopherol on the degradation of Sudan blue (II) dye by peroxide has also been shown. Z010 was prepared as a control sample with no α-tocopherol, and samples CS179, CS180, and CS181 were prepared with the coencapsulation of α-tocopherol.

To create these composite particles, (1,2)poly(butadiene)$_{15,000}$-b-poly(acrylic acid)$_{6,500}$ micelles were made to encapsulate Sudan blue (II) and α-tocopherol. Samples were prepared by dissolving (1,2)poly(butadiene)$_{15,000}$-b-poly (acrylic acid)$_{6,500}$ and Sudan blue (II) in tetrahydrofuran along with α-tocopherol, for samples CS179, CS180, and CS181. Composite particles were then prepared using the microfluidic mixing method with water as the antisolvent, resulting in a 20 mL composite particle solution with 9 parts water and 1-part tetrahydrofuran. Polyethylene glycol$_{4000}$ was then added at 10 mg/g to the resulting solution and mixed until dissolved. Finally, each solution was filtered through a Millipore™ filter to remove the solvent and leave a dry solid powder of micelles on a filter paper resulting in the control Z010, and the samples CS179, CS180, and CS181.

To determine if Sudan blue (II) is protected by the encapsulated α-tocopherol from degradation from organic peroxides Z010, CS179, CS180, and CS181 were dissolved in CR39 (allyl diglycol carbonate).

Z010, CS179, CS180 and CS181 were measured on the Agilent UV-Vis spectrometer to obtain the sample spectra before degradation. Each sample was then exposed to 0.06% w/w BPO and repeated absorbance measurements were collected over time.

Results

Figure 21:
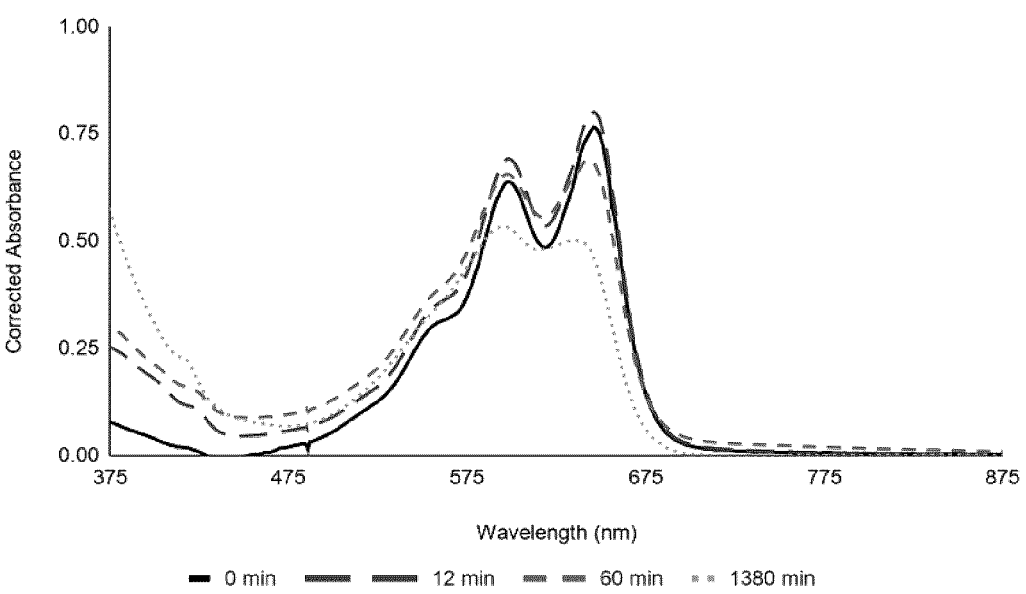
FIG. 21 shows a graph of absorbance as a function of wavelength over time of CS179 when exposed to 0.06% w/w BPO.
Figure 22:
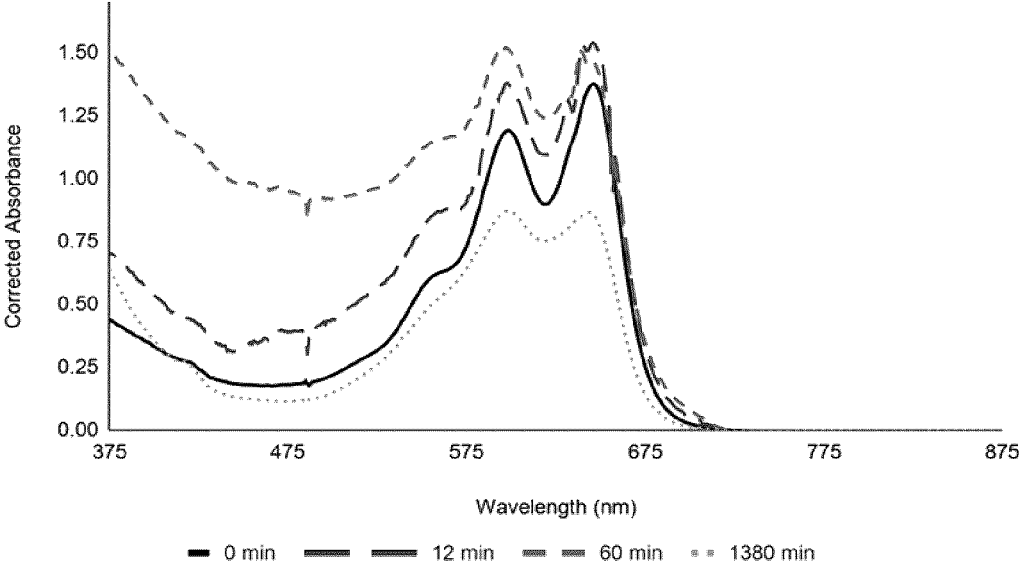
FIG. 22 shows a graph of absorbance as a function of wavelength over time of CS180 when exposed to 0.06% w/w BPO.
Figure 23:
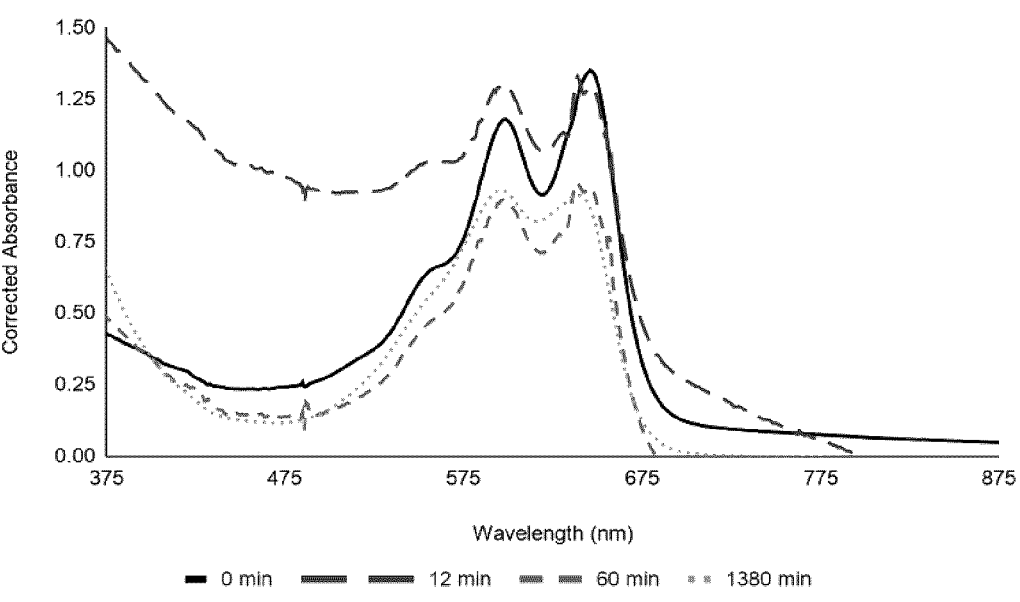
FIG. 23 shows a graph of absorbance as a function of wavelength over time of CS181 when exposed to 0.06% w/w BPO.
Figure 24:
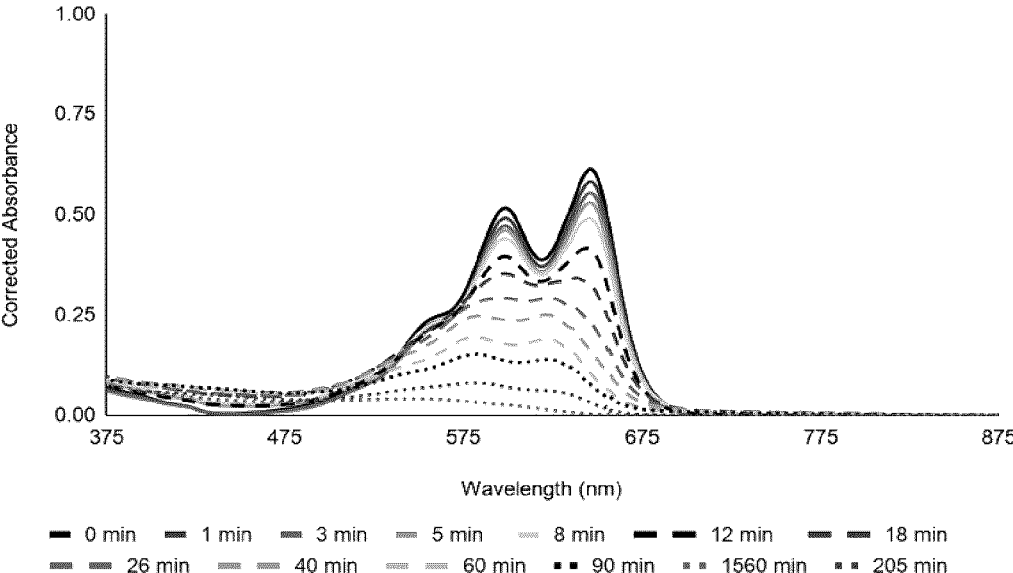
FIG. 24 shows a graph of absorbance as a function of wavelength over time of Sudan blue (II) after 0.06% w/w BPO exposure.

Results from the UV-Vis show that all samples have two dye peaks between 575 nm and 675 nm. Also, there is a significant difference between UV-Vis data for the samples with α-tocopherol (CS179, CS180, and CS181) and the sample without α-tocopherol (Z010). CS179, CS180 and CS181 had absorbance peaks from Sudan blue (II) after being exposed to BPO overnight (FIG. 21, FIG. 22, and FIG. 23) Z010 did not have absorbance peaks after degrading overnight (FIG. 24). Additionally, samples with α-tocopherol did not change colour during degradation while the sample without α-tocopherol had a significant change of colour from blue to colourless.

Conclusion

Benzoyl peroxide has been shown to degrade dyes when dissolved in CR39. Three test samples of composite particles of the present disclosure with different ratios of amphiphilic block copolymer, α-tocopherol and Sudan blue (II) were exposed to organic peroxides (0.06% w/w BPO). Unencapsulated dye samples demonstrated a complete loss of colour within one to two minutes, while encapsulated dye samples retained colour intensity beyond 20 minutes. Colour change was observed as a gradual loss of the blue colour of Sudan blue (II).

Figure 25:
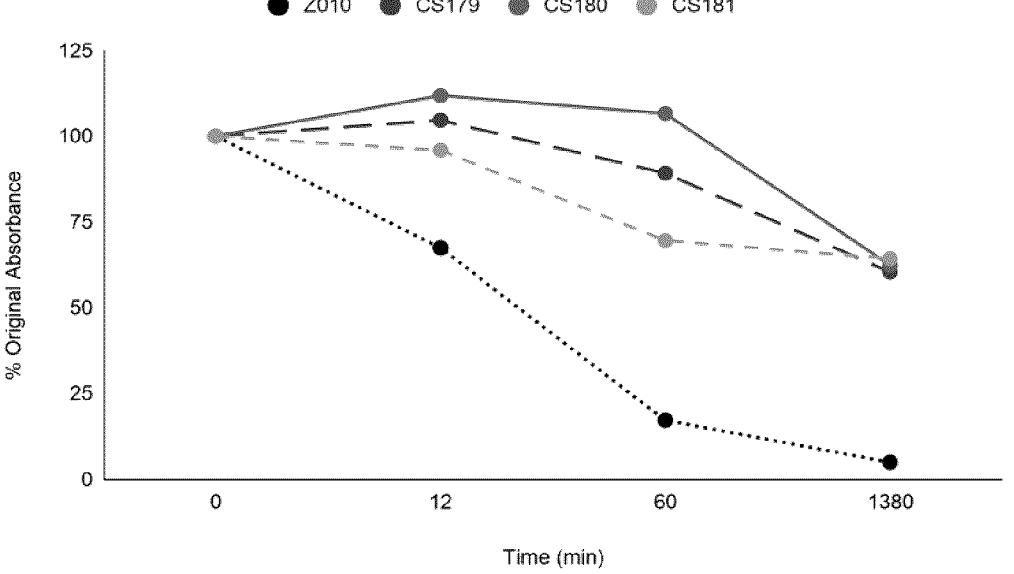
FIG. 25 shows a graph of absorbance as a function of wavelength over time (log scale) of Z010, CS179, CS180, and CS181 when exposed to 0.06% w/w BPO.

Degradation data was collected on the UV-Vis to observe the absorption degradation over time. The data collected confirms that the colour change of Z010 from blue to clear was a result of significant degradation (FIG. 25). After 1380 minutes, Z010 did not have any peaks on the absorbance spectra corresponding to the Sudan blue (II) dye and the total absorbance remaining was less than 5% of the initial absorbance. After 1380 minutes, CS179, CS180, and CS181 had distinct dye peaks and approximately 60% original absorbance. The lack of colour change of the test samples and large percentage of original absorbance remaining of each test sample proves that α-tocopherol has significantly reduced the rate of degradation of Sudan blue (II).

Example 6: Photobleaching Resistance Improvement in Sol Gel

To determine if free radical scavengers can be used to protect dyes from photochemical degradation, CS41 was prepared and dried for integration into sol gel material. The commercially available lens coating solution Hi-Gard™ 1090S was used as a model sol gel monomer. It can be appreciated that other common sol gel coating solutions could be used, and further, other thin films could also be used. The free radical scavenger used in this experiment was α-tocopherol, assessed at various concentrations to observe the effect on the rates of degradation.

The CS41 sample was dissolved in Hi-Gard sol-gel and diluted such that the approximate absorbance of the solution was 1 using a standard 1 cm cuvette. Aliquots of this sample were then taken and placed in separate vials. To these vials, α-tocopherol was added, such that the vials contained 0, 125, 250, 500, and 1000 µg/mL of α-tocopherol. These solutions were photobleached using a UV reaction chamber (250 nm, 12.8 mW/cm$^2$) until less than about 10% of the original absorbance at peak wavelength remained. The absorbance of the solutions was measured on the spectrophotometer every 30 seconds to observe the decay in absorbance.

Figure 26:
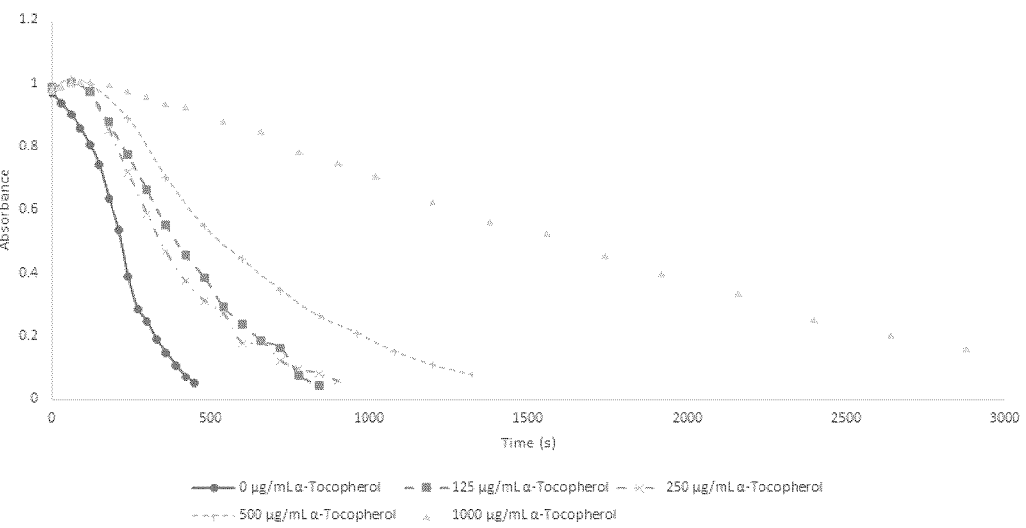
FIG. 26 shows a graph of the peak absorbance over time of CS41 samples suspended in sol gel monomer with varying concentrations of α-tocopherol, demonstrating the effect of α-tocopherol concentration on rate of photochemical degradation.

The results of the testing demonstrate that α-tocopherol showed a major improvement over the control solution lasting significantly longer than the control (FIG. 26).

The results of this study demonstrate the effect of free radical scavenger as an effective means to protect dyes from photochemical damage and degradation from exposure to UV and high-energy visible (HEV) light. α-tocopherol was found to be an effective photostabilizing agent, which at a concentration of 1000 µg/mL in the sol gel monomer led to an increased survival of the dye of 7 times longer compared to a sample not containing a photostabilizing agent.

Example 7: Encapsulation of Reactive Yellow 15

Procedures

This example demonstrates encapsulation of hydrophilic dyes in reverse micelles in a hydrophobic medium. Reactive yellow 15 was used as the hydrophilic dye.

Multiple solvent systems and polymers (and controls) were tested to determine which setup is best capable of making reverse micelles using reactive yellow 15. Degradation of all samples was done with BPO, including stock solutions of reactive yellow 15.

Stock solutions of CLS148, CLS149, CLS150, CLS151, CLS152, and CLS153 were made containing 2.5 mg of dye and 12.5 mg of polymer in 10 mL of solvent.

After filtration to remove undissolved materials, composite particles were prepared using the microfluidic mixing method with either tetrahydrofuran, hexane, or diethyl ether as the antisolvent, resulting in a composite particle solution of the above-named samples.

Each sample was then dried prior to CR39 integration. After the samples were completely dry, 10 mL of CR39 monomer was added to each vial and the vials were thoroughly mixed.

Finally, each test item was then measured on the UV-Vis to determine if any sample had absorbance relating to the dye, and each sample was subsequently exposed to 2.0% benzoyl peroxide, and absorbances for each solution were measured over time to measure the degradation.

Results

Figure 27:
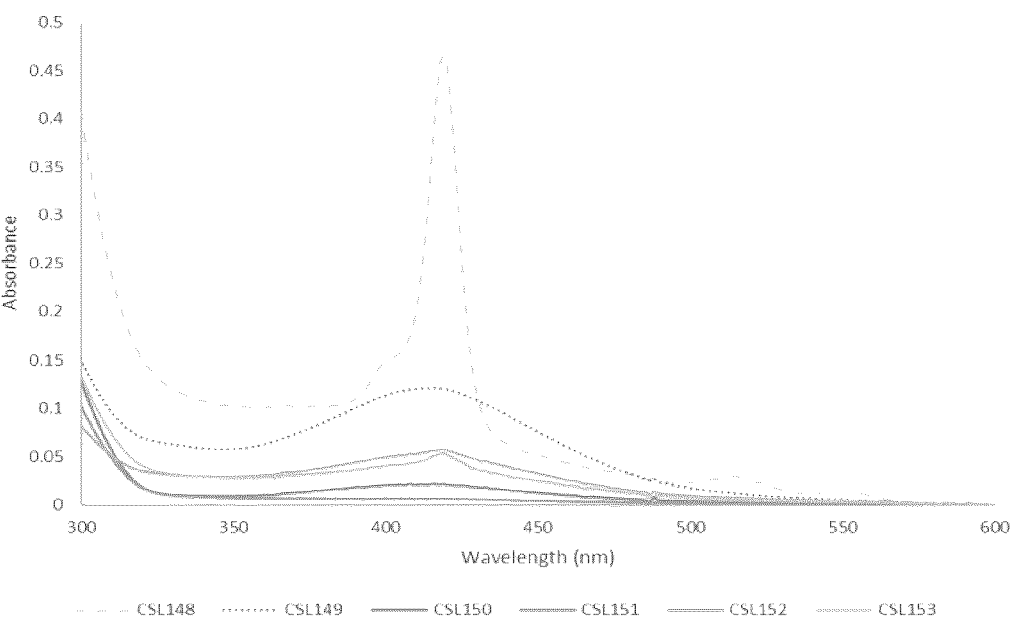
FIG. 27 shows a graph of absorbance as a function of wavelength of nanoparticles resuspended in CR39 monomer before BPO addition.
Figure 28:
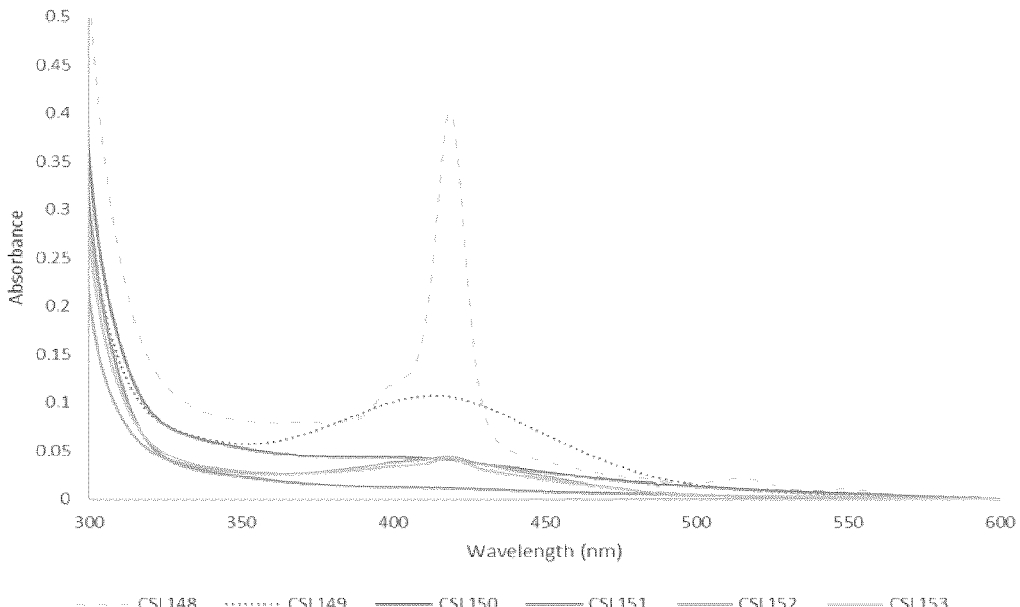
FIG. 28 shows a graph of absorbance as a function of wavelength of nanoparticles resuspended in CR39 monomer 1 hour after the addition of 0.1% w/w BPO.
Figure 29:
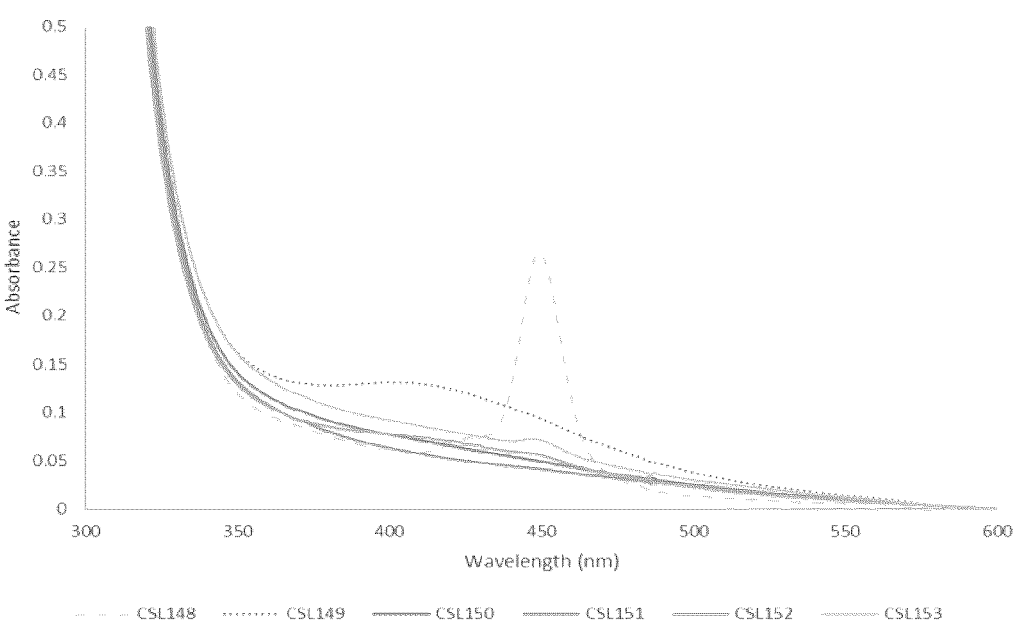
FIG. 29 shows a graph of absorbance as a function of wavelength of nanoparticles resuspended in CR39 monomer 1.5 hours after the addition of 2.0% w/w BPO.
Figure 30:
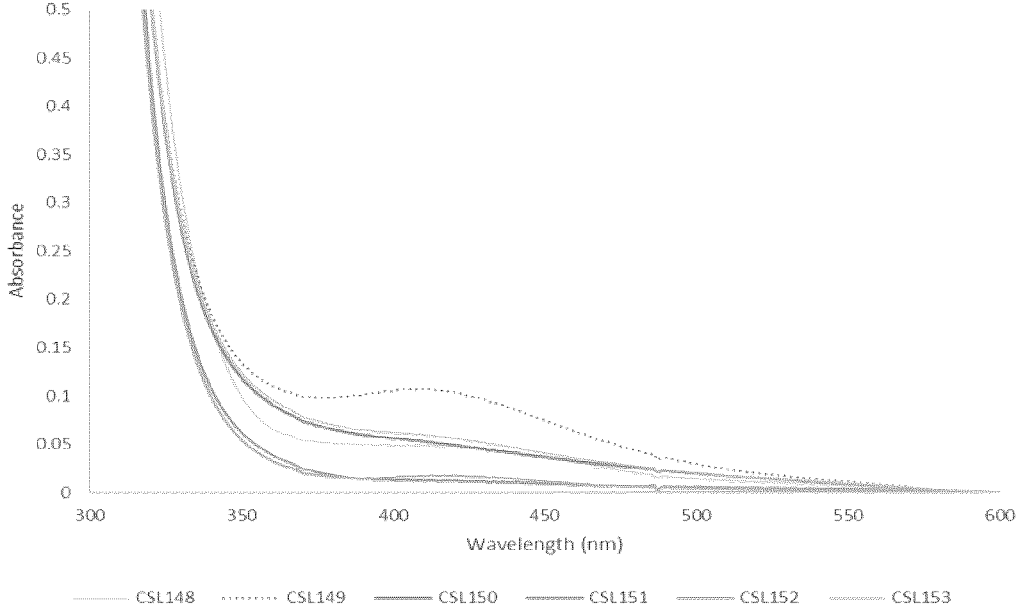
FIG. 30 shows a graph of absorbance as a function of wavelength of nanoparticles resuspended in CR39 monomer 72 hours after the addition of 2.0% w/w BPO.
Figure 31:
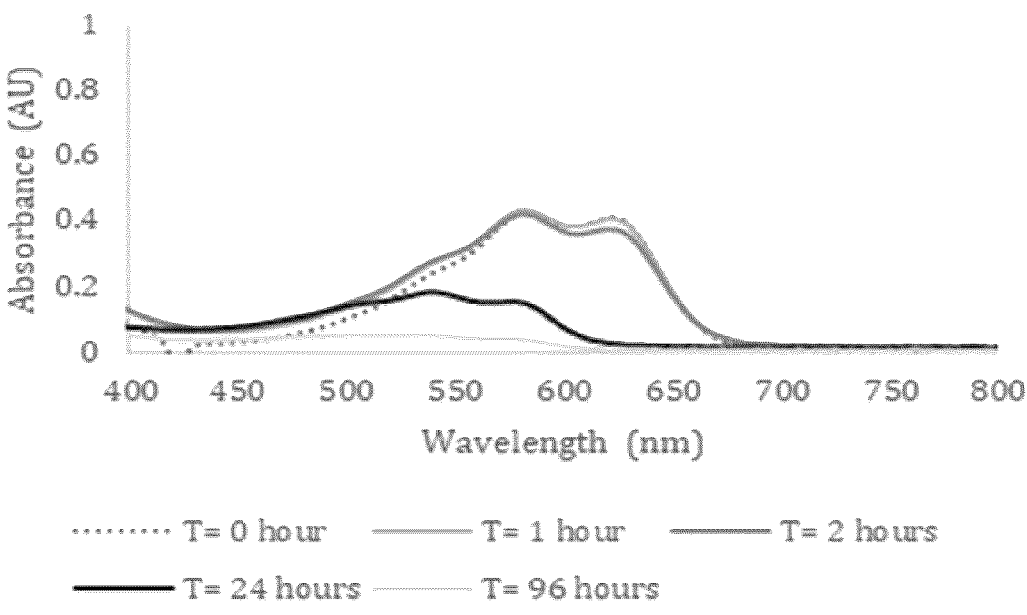
FIG. 31 shows a graph of absorbance as a function of wavelength for sample CSL011 at specific time points as it degrades via 2.0% w/w BPO.
Figure 32:
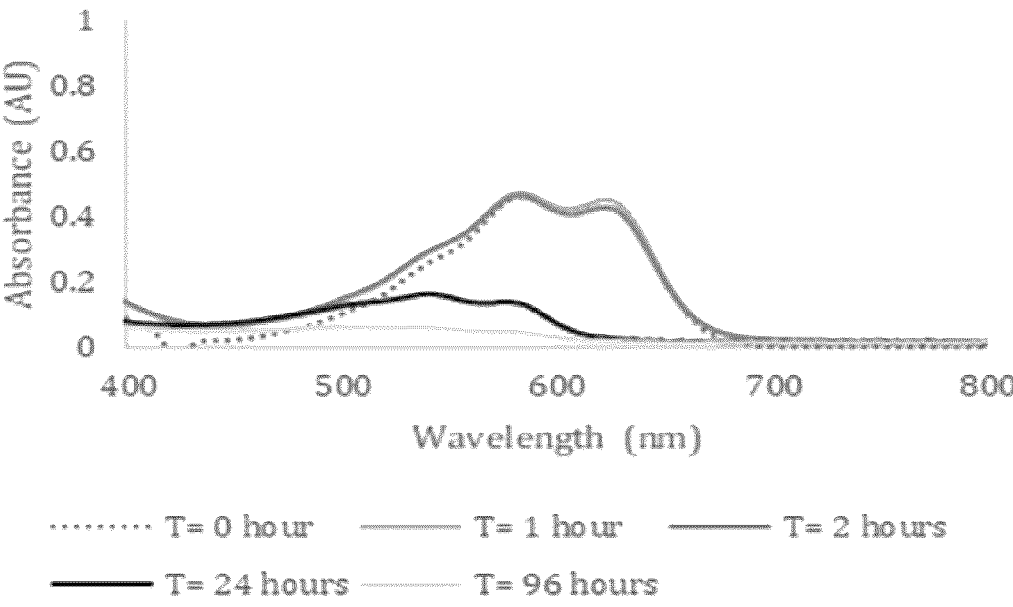
FIG. 32 shows a graph of absorbance as a function of wavelength for sample CSL012 at specific time points as it degrades via 2.0% w/w BPO.
Figure 33:
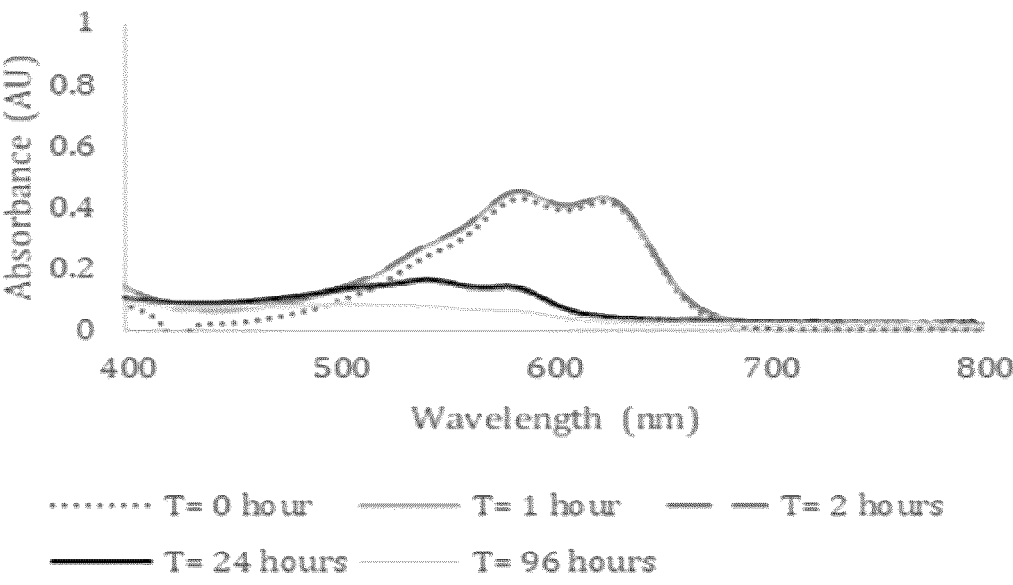
FIG. 33 shows a graph of absorbance as a function of wavelength for sample CSL013 at specific time points as it degrades via 2.0% w/w BPO.
Figure 34:
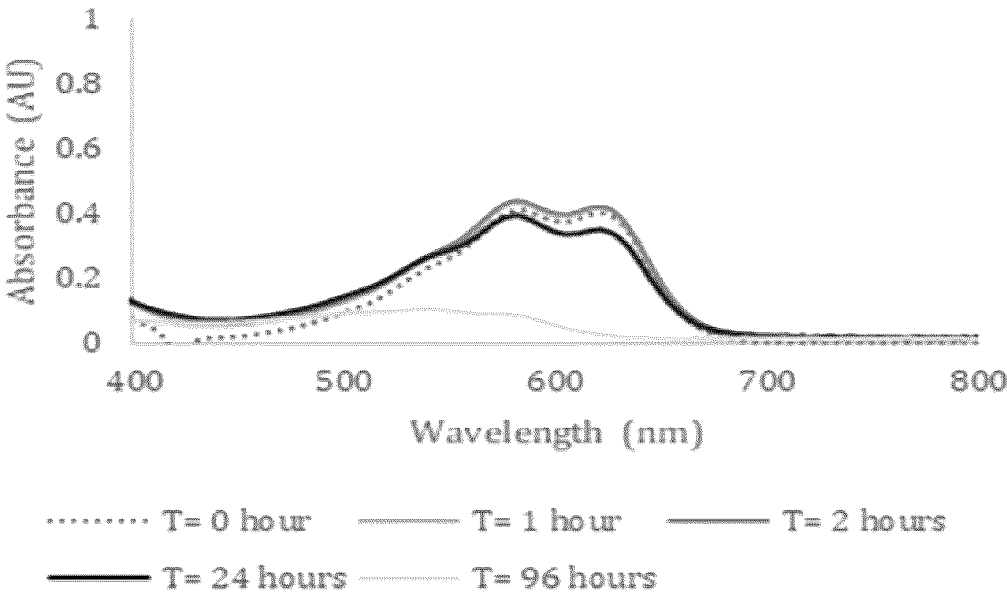
FIG. 34 shows a graph of absorbance as a function of wavelength for sample CSL014 at specific time points as it degrades via 2.0% w/w BPO.
Figure 35:
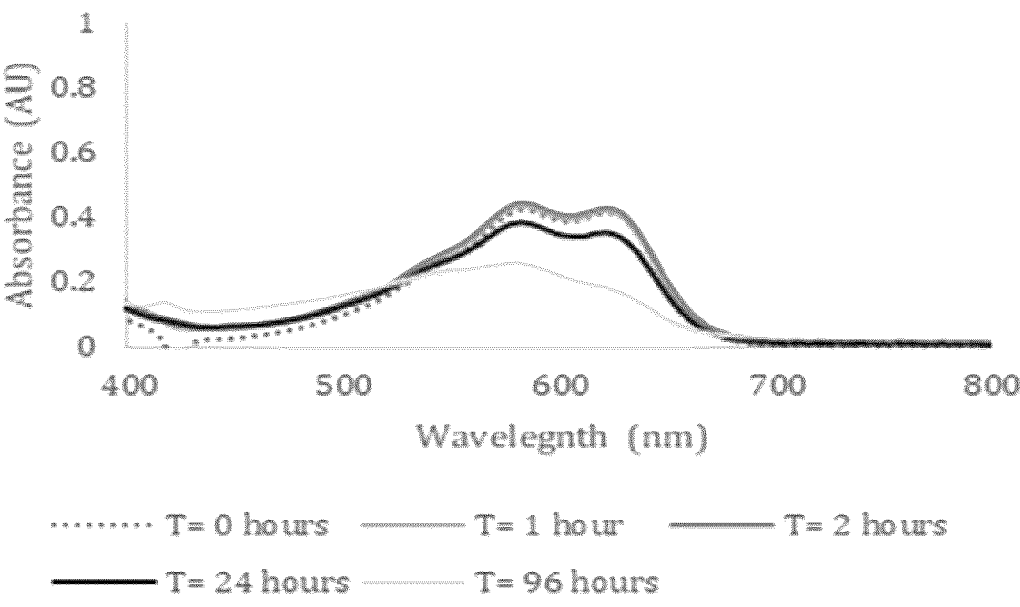
FIG. 35 shows a graph of absorbance as a function of wavelength for sample CSL015 at specific time points as it degrades via 2.0% w/w BPO.
Figure 36:
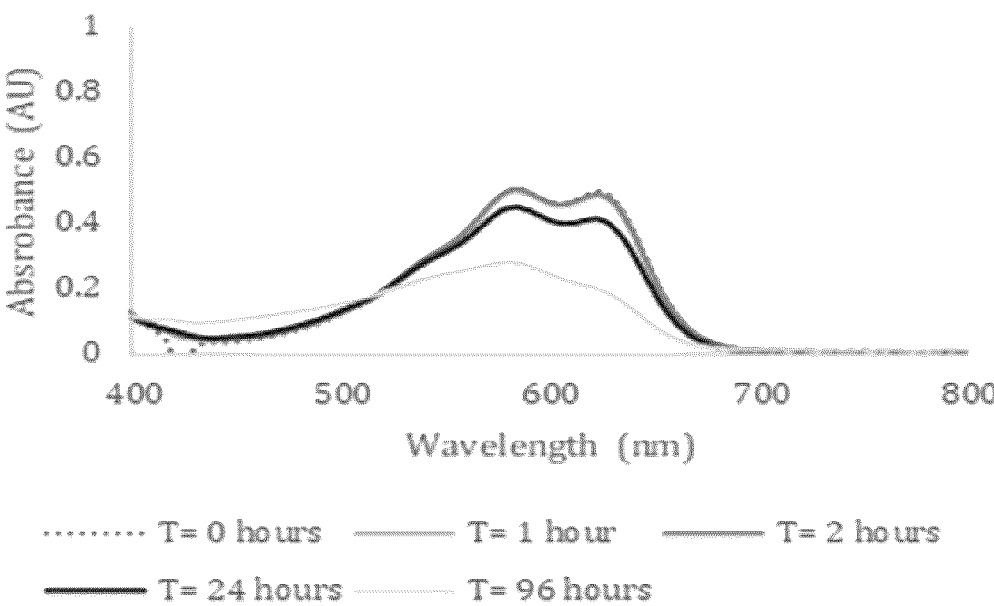
FIG. 36 shows a graph of absorbance as a function of wavelength for sample CSL016 at specific time points as it degrades via 2.0% w/w BPO.
Figure 37:
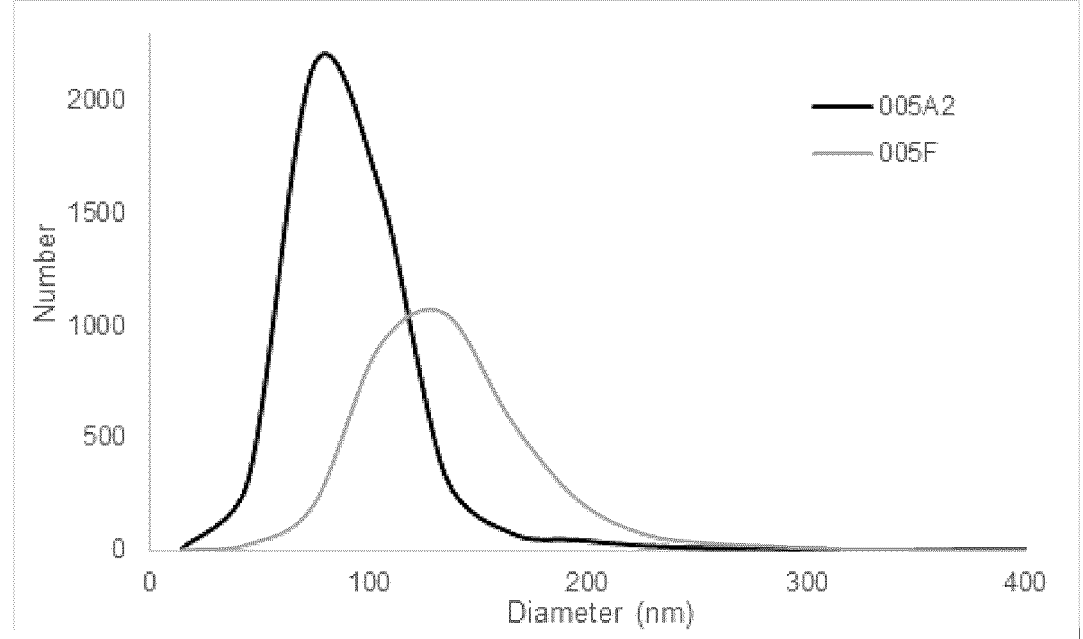
FIG. 37 shows a graph with particle count as a function of particle diameter for samples 005A2 and 005F as determined by NTA.

The results of the experiment show that resuspension of samples in CR39 were possible for some, but not all samples (FIG. 27). Without being bound to theory, this effect is due to specific interactions between the polymers used and the various solvents used. It should be interpreted that both the polymers and solvents are easily changed depending on the target matrix, and proper dispersion in said matrix can be optimized by controlling solvent and polymer compositions. When BPO was added at 0.1% weight ratio, very little degradation was seen after one hour of exposure (FIG. 28). When BPO was added at 2.0% weight ratio, most samples lost all their absorbance after 90 minutes of exposure, with a select few degrading partially (FIG. 29). Lastly, when checking the degradation after 3 days, all but one sample was completely degraded (FIG. 30).

Conclusion

Encapsulation of reactive yellow 15 with polymers in a reverse micelle was demonstrated using a two solvent microfluidic system. These reverse micelles had greatly improved solubility of reactive yellow 15 in hydrophobic solvents compared to unencapsulated dye. It was also found that THF as the antisolvent was far superior to hexane or ether, likely because hexane and ether were too nonpolar.

Using reverse micellization as a method to solubilize reactive yellow 15 into a nonpolar medium is shown here to be successful. These samples were dried, and resuspended into CR39 monomer, showing absorbance for reactive yellow 15, a dye that is insoluble in CR39 monomer. Samples in CR39 monomer were exposed to BPO. It was discovered that some samples showed exceptional resistance to BPO, including samples CLS148 and CLS149.

Example 8: Encapsulation of Remazol Brilliant Blue and Free Radical Scavengers Procedures The example shows that ascorbic acid, as a hydrophilic free-radical scavenger, can prevent dye degradation via BPO in a reverse micelle.

Embodiments for CSL011 to 016 were made using 0.5 mg/mL Remazol Brilliant Blue R (RBB) as the dye, 2.5 mg/mL Polystyrene$_{9500}$-b-polyethylene oxide$_{5000}$ (PS$_{9500}$-b-PEO$_{5000}$) as the polymer, and concentrations of ascorbic acid that were varied in solution.

First, a stock solution was prepared by dissolving 15.5 mg of PS$_{9500}$-b-PEO$_{5000}$ and 3.5 mg of RBB in 7 mL of methanol. 1 mL of the stock solution was added to 6 new vials and values of ascorbic acid was added to each vial and left to stir until fully dissolved. Ascorbic acid was added to CSL016 after performing the direct injection in THF.

Reverse micelles were synthesized by directly injecting 1 mL of the sample solutions into separate vials containing 9 mL of THF, while stirring rapidly on a stir plate. Samples were divided into two separate 5 mL solutions and were measured on the UV-Vis. Samples were then exposed to 2% w/w BPO to perform the degradation. UV-Vis measurements of the samples were taken after 1 hour, 2 hours, 24 hours and after 96 hours.

Results

A positive correlation between ascorbic acid concentration and degradation inhibition (FIGS. 31 to 36) was observed. When 2% w/w BPO was added, there was little to no change in absorbance across the samples after 2 hours. After 24 hours, half of the samples (CSL011-013) were almost completely degraded, with the other half retaining most of their absorbance. After 96 hours, all samples were completely degraded except for CSL015 and 016 which retained most of their absorbance.

Conclusions

Free and encapsulated ascorbic acid provides significant dye protection against degradation compared to samples without ascorbic acid. Samples containing ascorbic acid were observed to retain a significant colour and absorbance value after the peroxide exposure presented here, while the sample without ascorbic acid was observed to degrade completely. This example demonstrates the successful protection of a hydrophilic dye by the coencapsulation of a hydrophilic free radical scavenging agent in a reverse phase micelle.

Example 9: Crosslinking of Composite Particles

Procedures

In this set of experiments, carboxylic acid groups present within the hydrophilic PAA shell of a normal phase micelle were reacted with a diamine crosslinking agent (2,2-(ethylene dioxene) bis(ethyl amine)) or 1,4-Butanediol Bis(3-aminopropyl) Ether) using 1-(3-Dimethylaminopropyl)-3-ethylcarbodiimide Hydrochloride (EDC) as an initiator. The crosslinkers are terminated on both ends with reactive primary amines. Several diblock copolymers were micellized using a microfluidic mixing system, encapsulating zinc (II) tetraphenyl porphyrin dye. The effects of amide crosslinking using these crosslinkers were investigated.

Embodiments were made using three different PAA containing polymers (CSL127, CSL128, CSL129, CSL130, 003A, 003C, 0003D, 003E, 005A2, and 005F). Samples that were crosslinked had freshly prepared EDC (varying volumes, 1 M in aqueous solution) added to each vial followed by the diamine (varying volumes, 1 M in aqueous solution). HEPES buffer was added to some samples to control the pH. The samples were then dried using vacuum filtration, and washed with at least 10 mL deionized water to remove unreacted reagents and any reaction side products.

Results

CSL127, CSL128, CSL129, and CSL130 were measured using NTA before and after crosslinking, the results of which are found in Table 1. The crosslinked particles had a higher average particle diameter than the uncrosslinked samples. The crosslinked samples had a lower absolute zeta potential than the uncrosslinked samples, which is evidence that the crosslinking reaction occurred and reduced the negative surface charge of the particles.

TABLE 1

Mean particle diameter, particle diameter standard deviation, and zeta potential for uncrosslinked and crosslinked samples CSL127, CSL128, CSL129, and CSL130

| Sample | Modification | Mean Particle Diameter (nm) | Zeta Potential (mV) |
|---|---|---|---|
| CSL127 | uncrosslinked | 149 ± 103 | −52.6 ± 2.53 |
| CSL128 | crosslinked | 205 ± 72.2 | −33.8 ± 1.43 |
| CSL129 | uncrosslinked | 141 ± 67.7 | −55.2 ± 2.17 |
| CSL130 | crosslinked | 158 ± 46.4 | −33.1 ± 0.58 |

003D and 003E (samples with added crosslinking reagents) had coloured macroscale aggregates above the solution level that were not present in 003A and 003C (equivalent samples with no added crosslinking reagents), indicating a small extent of intermicellar crosslinking. Particle sizes and zeta potentials of these samples were measured (Table 2). 003D and 003E samples with added crosslinkers had lower particle sizes than uncrosslinked samples (003D and 003E). 005F (crosslinked) had a larger median particle size and broader distribution than the 005A2 uncrosslinked samples, which is due to successful crosslinking.

TABLE 2

Mean particle diameter, particle diameter standard
deviation, and zeta potential for uncrosslinked and
crosslinked samples 003A, 003C, 003D, and 003E

| Sample | Modification | NTA Median Size (nm) | Zeta potential (mV) |
|--------|--------------|----------------------|---------------------|
| 003A | uncrosslinked | 299 ± 118 | −37.88 ± 1.48 |
| 003C | crosslinked | 367 ± 136 | −33.77 ± 0.74 |
| 003D | uncrosslinked | 161 ± 99 | −38.06 ± 2.15 |
| 003E | crosslinked | 242 ± 128 | −40.65 ± 1.79 |

Conclusion

Evidence of a reaction occurring was observed for the encapsulate materials, as the sample with the crosslinking reagents aggregated significantly more than the control sample. Crosslinking is known to be an effective method of improving particle stability, and such crosslinking methods have been demonstrated to be suitable with the micelle systems described here.

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

The invention claimed is:

1. A composite particle comprising:
    a dye having an absorbance in the range of from the ultraviolet (UV) region to the infrared (IR) region of the electromagnetic spectrum;
    a free radical scavenger; and
    an amphiphilic block copolymer encapsulating the dye and the free radical scavenger.

2. The composite particle of claim 1, wherein the dye has an absorbance in the region of 380 nm to 500 nm, the region of 410 nm to 450 nm, or the region of 500 nm to 700 nm.

3. The composite particle of claim 1, wherein the dye is selected from coumarins, fluoresceins, rhodamines, eosins, pyrromethenes, cyanines, carbocyanines, flavins, oxazines, carbazines, stilbenes, diphenylstilbenes, oxazols, diphenyls, terphenyls, quaterphenyls, polyphenyls, phenyloxazones, phenoxazoniums, pyridines, pyridiniums, carotenoids, retinoids, porphyrins, phthalocyanines, benzophenones, metal oxides, benzotriazoles, tocopherols, tocotrienols, anthracenes, perylene, polycyclic aromatic hydrocarbons (PAH), polyenes, corrins, chlorins, corphins, indolenines, chlorophylls, azo dyes, polymethines, diarylmethanes, triarylmethanes, polyenes, anthracinediones, pyrazolones, anthraquinones, pyrans, phenothiazines, triazines, oxalanilides, acridines, benzanthrones, xanthenes, and combinations thereof.

4. The composite particle of claim 1, wherein the free radical scavenger is selected from an antioxidant agent, butylated hydroxytoluene, α-tocopherol, ascorbic acid, and mixtures thereof.

5. The composite particle of claim 1, wherein the amphiphilic block copolymer is selected from a poly(alkyl acrylate)-based copolymer, a poly(alkyl methacrylate)-based copolymer, a poly(acrylic acid)-based copolymer, a poly(methacrylic acid)-based copolymer, a polydiene-based copolymer, a poly(N-isopropylacrylamide)-based copolymer, a polyethylene glycol-based copolymer, a poly(methylene indane)-based copolymer, a polysiloxane-based copolymer, a polystyrene-based copolymer, a substituted polystyrene-based copolymer, a poly(vinyl pyridine)-based copolymer, a poly(vinyl alcohol) based copolymer, a poly(alkylacrylic acid)-based copolymer, a poly(alkylene oxide)-based copolymer, a poly(dialkyl siloxane)-based copolymer, a poly(olefin)-based copolymer, a poly(alkylene oxide diacrylate)-based copolymer, a poly(butanediol diacrylate)-based copolymer, and combinations thereof.

6. The composite particle of claim 1, wherein the amphiphilic block copolymer is crosslinked.

7. The composite particle of claim 6, wherein the amphiphilic block copolymer is crosslinked using a crosslinking method selected from dialdehyde crosslinking, diamine crosslinking, diol crosslinking, ester crosslinking, free radical initiated alkene polymerization, quaternary-ammonium crosslinking, silane crosslinking, trialdehyde crosslinking, triamine crosslinking, triol crosslinking, urethane crosslinking, acrylate crosslinking, metal chelation crosslinking and combinations thereof.

8. The composite particle of claim 6, wherein the amphiphilic block copolymer is crosslinked using silane crosslinking and free radical initiated alkene polymerization crosslinking.

9. The composite particle of claim 1, wherein the amphiphilic block copolymer is selected from poly(1,2-butadiene)-b-poly(acrylic acid) crosslinked with AIBN, poly(1,2-butadiene)-b-poly(acrylic acid) crosslinked with fumed silica, poly(1,2-butadiene)-b-poly(acrylic acid) crosslinked with TEOS, poly(1,2-butadiene)-b-poly(acrylic acid) crosslinked with TEOS and AIBN, $poly(1,2\text{-butadiene})_{15000}$-b-$poly(acrylic\ acid)_{6500}$ crosslinked with AIBN, $poly(1,2\text{-butadiene})_{15000}$-b-$poly(acrylic\ acid)_{6500}$ crosslinked with fumed silica, $poly(1,2\text{-butadiene})_{15000}$-b-$poly(acrylic\ acid)_{6500}$ crosslinked with TEOS, or $poly(1,2\text{-butadiene})_{15000}$-b-$poly(acrylic\ acid)_{6500}$ crosslinked with TEOS and AIBN.

10. The composite particle of claim 1, wherein the diameter of the composite particle is about 1 nm to about 10 μm.

11. The composite particle of claim 1, wherein the composite particle that has a maximum UV-Vis absorbance after exposure to peroxide for 15 min, 30 min, 90 min, 3 hours, 5 hours, 7 hours, or 10 hours that is at least 50%, 60%, 70%, 80%, or 90% of the maximum UV-Vis absorbance before the exposure to the peroxide.

12. An ophthalmic lens monomer composition comprising
    a composite particle as defined in claim 1;
    a polymerizable monomer; and
    a catalyst suitable for initiating polymerization of the polymerizable monomer.

13. The ophthalmic lens monomer composition of claim 12, wherein the polymerizable monomer comprises an allyl monomer selected from ethylene glycol bis(allyl carbonate), oligomers of diethylene glycol bis(allyl carbonate), diethylene glycol bis(allyl carbonate), bisphenol A bis(allyl carbonate), oligomers of ethylene glycol bis(allyl carbonate), diallyl phthalates, diallyl terephthalate, and mixtures thereof.

14. The ophthalmic lens monomer composition of claim 12, wherein the polymerizable monomer further comprises a second monomer selected from [alpha]-chlorostyrene, divinylbenzene, 2,2-bis[4-((meth)-acryloxypolyethoxy)phenyl]propane,methyl (meth)acrylate, n-butyl (meth)acrylate, styrene, n-hexyl (meth)acrylate, cyclohexyl (meth)acrylate, 2-ethylhexyl (meth)acrylate, chloromethylstyrene, methoxydiethylene glycol (meth)acrylate, methoxypolyethylene glycol (meth)acrylate, vinyltoluene, triethylene glycol di(meth)acrylate, polyethylene glycol di(meth)acrylate, methylstyrene, stearyl (meth)acrylate, lauryl (meth)acrylate, phenyl (meth)acrylate, glycidyl (meth)acrylate and benzyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate, 3-chloro-2-hydroxypropyl (meth)acrylate, 4-hydroxybutyl (meth)acrylate; di(meth)acrylates such as ethylene glycol di(meth)acrylate, diethylene glycol di(meth)acrylate, 1,3-butylene glycol di(meth)acrylate, 1,6-hexanediol di(meth)acrylate, neopentyl glycol di(meth)acrylate, polypropylene glycol di(meth) acrylate, 2-hydroxy-1,3-di(meth)acryloxypropane, 2,2-bis [4-((meth)acryloxyethoxy)phenyl]propane, 2,2-bis[4-((meth)acryloxydiethoxy)phenyl]propane, trimethylolpropane, tri(meth)acrylate, tetramethylolmethane tri(meth)acrylate, tetramethylolmethane tetra(meth)acrylate, and combinations thereof.

15. The ophthalmic lens monomer composition of claim 12, wherein the catalyst is selected from peroxide, organic azo compound, organotin compound, and mixtures thereof.

16. The ophthalmic lens monomer composition of claim 12 comprising about 0.01% w/w to about 10% w/w of the composite particle.

17. The ophthalmic lens monomer composition of claim 12, further comprises a surfactant or cryoprotectant.

18. An ophthalmic lens comprising a composite particle as defined in claim 1.

19. A kit for the preparation ophthalmic lens comprising one or more composite particles as defined in claim 1;
a polymerizable monomer; and
a catalyst suitable for initiating polymerization of the polymerizable monomer.

20. A sol-gel composition comprising one or more composite particles as defined in claim 1 and a polymerizable sol-gel monomer.

* * * * *